(12) United States Patent
Ito et al.

(10) Patent No.: US 12,532,556 B2
(45) Date of Patent: Jan. 20, 2026

(54) PHOTOELECTRIC CONVERSION APPARATUS HAVING AVALANCHE PHOTODIODE

(71) Applicant: CANON KABUSHIKI KAISHA, Tokyo (JP)

(72) Inventors: Keisuke Ito, Kanagawa (JP); Yasuharu Ota, Tokyo (JP); Masahiro Kobayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 607 days.

(21) Appl. No.: 18/047,133

(22) Filed: Oct. 17, 2022

(65) Prior Publication Data

US 2023/0117198 A1 Apr. 20, 2023

(30) Foreign Application Priority Data

Oct. 20, 2021 (JP) .................................. 2021-171691
Jul. 20, 2022 (JP) .................................. 2022-115906

(51) Int. Cl.
*H10F 39/00* (2025.01)
*H04N 17/00* (2006.01)
*H04N 25/702* (2023.01)
*H04N 25/77* (2023.01)
*H10F 39/18* (2025.01)

(52) U.S. Cl.
CPC ....... *H10F 39/8023* (2025.01); *H04N 25/702* (2023.01); *H04N 25/77* (2023.01); *H10F 39/18* (2025.01); *H10F 39/8057* (2025.01); *H10F 39/8063* (2025.01); *H10F 39/807* (2025.01); *H04N 17/002* (2013.01)

(58) Field of Classification Search
CPC .......................... H10F 39/8057; H04N 25/773
See application file for complete search history.

(56) References Cited

U.S. PATENT DOCUMENTS

| | | | |
|---|---|---|---|
| 2013/0062500 A1* | 3/2013 | Oh ....................... | H04N 25/633 250/206 |
| 2014/0027617 A1* | 1/2014 | Amikawa ............ | H04N 25/633 257/229 |
| 2020/0158566 A1* | 5/2020 | Ota ...................... | H04N 25/773 |

FOREIGN PATENT DOCUMENTS

| | | |
|---|---|---|
| JP | 2013069958 A | 4/2013 |
| JP | 2020088520 A | 6/2020 |
| JP | 2020123847 A | 8/2020 |

(Continued)

*Primary Examiner* — Thanh Luu
(74) *Attorney, Agent, or Firm* — Canon U.S.A., Inc. IP Division

(57) ABSTRACT

A photoelectric conversion apparatus includes a pixel area including a plurality of pixels each including an avalanche photodiode including an anode and a cathode. The plurality of pixels includes effective pixels that output a photon detection signal responsive to photo detection, dummy pixels that do not output the photon detection signal, and optical black pixels including a light shielding portion. The pixel area includes a first area including the effective pixels, a second area including the dummy pixels, and a third area including the optical black pixels. The second area includes a first portion in contact with an end of the pixel area and a second portion. The first portion, the first area, the second portion, and the third area are disposed in this order in a first direction. A width of the second portion is larger than a width of the first portion in the first direction.

20 Claims, 16 Drawing Sheets

(56) References Cited

FOREIGN PATENT DOCUMENTS

| JP | 2021013144 A | 2/2021 |
|----|--------------|--------|
| JP | 2021132095 A | 9/2021 |

\* cited by examiner

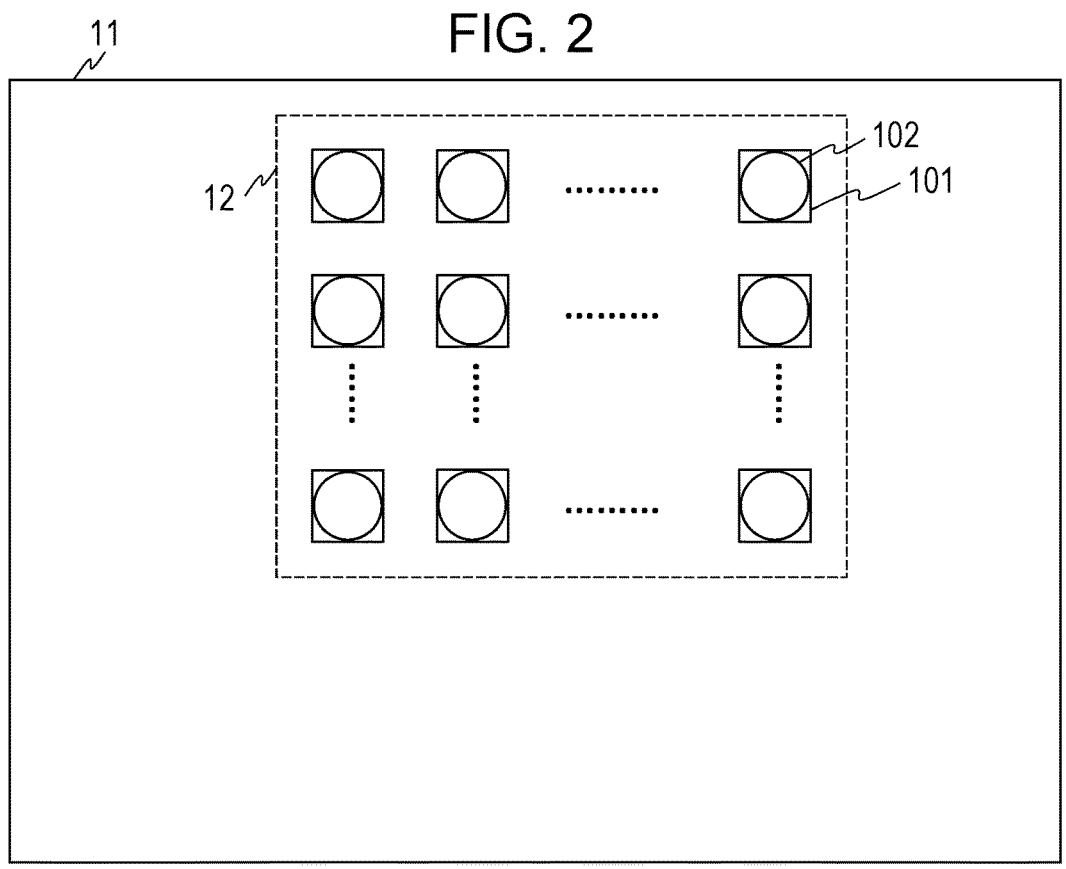
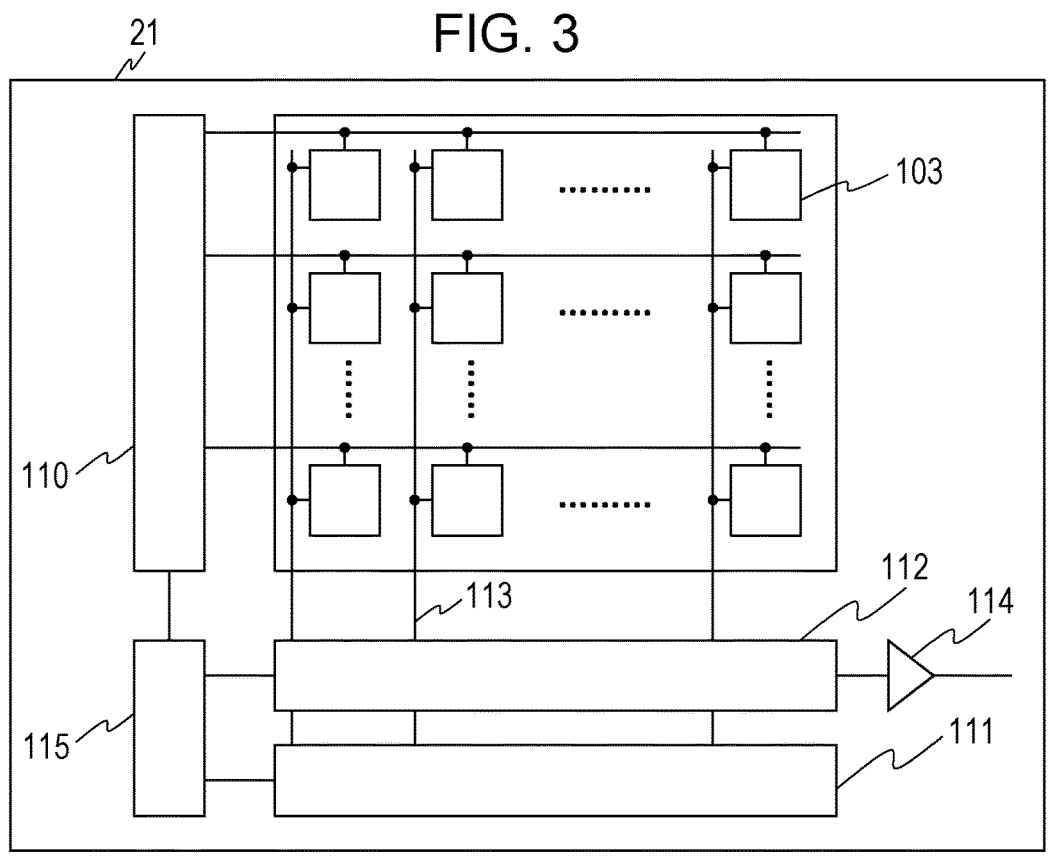

PHOTOELECTRIC CONVERSION APPARATUS HAVING AVALANCHE PHOTODIODE

BACKGROUND

Technical Field

One disclosed aspect of the embodiments relates to a photoelectric conversion apparatus.

Description of the Related Art

Japanese Patent Laid-Open No. 2020-123847 discloses a photoelectric conversion apparatus in which a plurality of pixels each including an avalanche photodiode (hereinafter abbreviated as APD) is disposed.

Such a photoelectric conversion apparatus may include an optical black pixel (hereinafter referred to as "OB pixel") to detect a signal not responsive to external light. Specifically, the OB pixel includes a light shielding portion above the APD to detect a signal not based on external light.

When light is incident on an effective pixel, and photoelectric conversion is performed, avalanche light emission caused by transfer of charges to adjacent pixels and rebonding of electrons and holes occurs. In this case, if an area in which the effective pixel is disposed and an area in which the OB pixel is disposed are adjacent to each other, avalanche multiplication in the OB pixel may be induced by the avalanche light emission from the effective pixel, decreasing the image quality.

SUMMARY

One disclosed aspect of the embodiments provides a photoelectric conversion apparatus including a pixel area including a plurality of pixels each including an avalanche photodiode including an anode and a cathode. The plurality of pixels includes effective pixels that output a photon detection signal responsive to photo detection, dummy pixels that do not output the photon detection signal, and optical black pixels including a light shielding portion. The pixel area includes a first area including the effective pixels, a second area including the dummy pixels, and a third area including the optical black pixels. The second area includes a first portion in contact with an end of the pixel area and a second portion. The first portion, the first area, the second portion, and the third area are disposed in this order in a first direction. A width of the second portion is larger than a width of the first portion in the first direction.

Further features of the disclosure will become apparent from the following description of exemplary embodiments with reference to the attached drawings.

BRIEF DESCRIPTION OF THE DRAWINGS

FIG. 2 is a schematic diagram of a photodiode (PD) substrate of a photoelectric conversion apparatus according to an embodiment.

FIG. 3 is a schematic diagram of a circuit substrate of a photoelectric conversion apparatus according to an embodiment.

DESCRIPTION OF THE EMBODIMENTS

Figure 1:
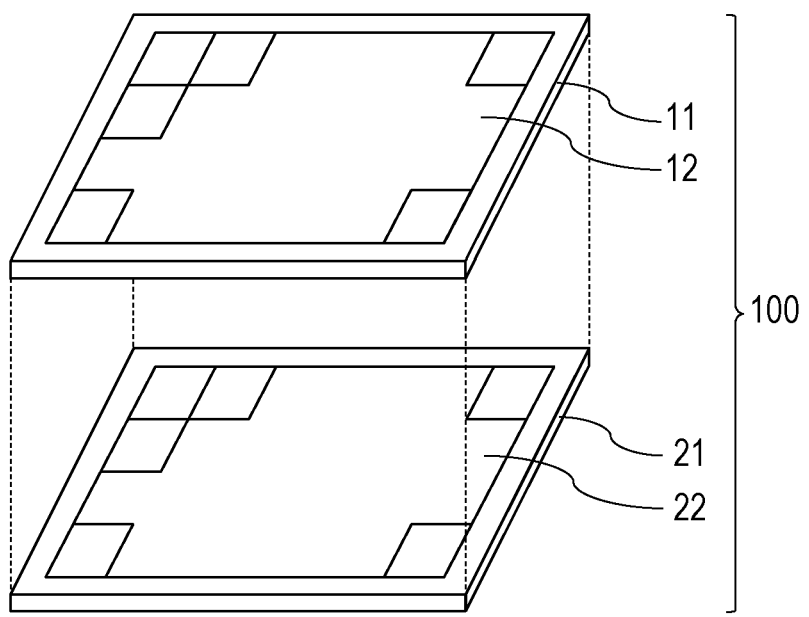
FIG. 1 is a schematic diagram of a photoelectric conversion apparatus according to an embodiment.

The following is for embodying the technical spirit of the disclosure and is not intended to limit the disclosure. The sizes and the positional relationship of the members shown in the drawings may be exaggerated for the purpose of clarification. In the following description, description of the same component may be omitted using the same reference sign.

Embodiments of the disclosure will be described in detail hereinbelow with reference to the drawings. In the following description, terms indicating specific directions or locations (for example, "top", "bottom", "right", "left", and other terms containing these terms) are used as needed. It is to be understood that those terms are used to facilitate understanding the embodiments with reference to the drawings and that the technical scope of the disclosure is not limited by the meaning of those terms. In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, when executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

In this specification, a plan view is a view from the direction perpendicular to the light incidence surface of a semiconductor layer. A cross sectional view is a view in the direction perpendicular to the light incidence surface of the semiconductor layer. If the light incidence surface of the semiconductor layer is rough in microscopic view, the plan view is defined on the basis of the light incidence surface of the semiconductor layer in macroscopic view.

In the following description, the anode of an avalanche photodiode (APD) is set at a fixed potential, and signals are taken out from the cathode. Accordingly, a semiconductor region of a first conductivity type in which majority carrier are charges of the same polarity as the signal charge is an N-type semiconductor region, and a semiconductor region of a second conductivity type in which majority carriers are charges of a polarity different from the signal charge is a P-type semiconductor region.

The disclosure applies also when the cathode of the APD is at a fixed potential, and signals are taken out from the anode. In this case, the semiconductor region of the first conductivity type in which majority carriers are charges of the same polarity as the signal charge is a P-type semiconductor region, and the semiconductor region of the second conductivity type in which majority carriers are charges of a polarity different from the signal charge is a N-type semiconductor region. While the following describes a case where one of the nodes of the APD is at a fixed potential, the potentials of both nodes may be varied.

In this specification, the term "impurity concentration" refers to net impurity concentration minus compensation by impurities of the opposite conductivity type. In other words, "impurity concentration" refers to net doping concentration. A region in which P-type additive impurity concentration is higher than N-type additive impurity concentration is a P-type semiconductor region. In contrast, a region in which N-type additive impurity concentration is higher than P-type additive impurity concentration is an N-type semiconductor region.

First Embodiment

A photoelectric conversion apparatus and a method of driving the same according to a first embodiment of the disclosure will be described with reference to FIGS. 1 to 9.

FIG. 1 is a diagram illustrating the configuration of a laminated photoelectric conversion apparatus 100. The photoelectric conversion apparatus 100 includes two substrates, a sensor substrate 11 and a circuit substrate 21, layered and electrically connected to each other. The sensor substrate 11 include a first semiconductor layer including a photoelectric conversion element 102, described later, and a first wiring structure. The circuit substrate 21 includes a second semiconductor layer including a signal processing unit or circuit 103, described layer, and a second wiring structure. The photoelectric conversion apparatus 100 are configured such that the second semiconductor layer, the second wiring structure, the first wiring structure, and the first semiconductor layer are laminated in this order. The photoelectric conversion apparatuses described in the individual embodiments are backside-lamination type photoelectric conversion apparatuses in which light is incident on a second surface and the circuit substrate is placed on a first surface.

In the following description, the sensor substrate 11 and the circuit substrate 21 are diced chips. However, the substrates are not limited to the chips. For example, the substrates may be wafers. The substrates may be diced after being laminated in wafer state or may be diced into chips from wafers and then laminated and joined.

The sensor substrate 11 includes a pixel area 12. The circuit substrate 21 includes a circuit area 22 that processes signals detected in the pixel area 12.

FIG. 2 is a diagram illustrating an example of the arrangement of the sensor substrate 11. Pixels 101 each including the photoelectric conversion element 102 including an APD are arranged in two-dimensional array in plan view to form the pixel area 12.

The pixels 101 are typically for forming an image but, for use in the time of flight (ToF) method, do not necessarily need to form an image. In other words, the pixels 101 may be for measuring the time of arrival of light and the amount of light.

FIG. 3 is a configuration diagram of the circuit substrate 21. The circuit substrate 21 includes signal processing units or circuits 103 that process the charges photoelectrically converted by the photoelectric conversion elements 102 in FIG. 2, a reading circuit 112, a control-pulse generating unit or circuit 115, a horizontal scanning circuit or circuit unit 111, signal lines 113, and a vertical scanning circuit or circuit unit 110.

The photoelectric conversion element 102 in FIG. 2 and the signal processing unit 103 in FIG. 3 are electrically connected via a connecting wire provided for each pixel 101.

The vertical scanning circuit unit 110 receives a control pulse supplied from the control-pulse generating unit 115 and supplies the control pulse to each pixel 101. The vertical scanning circuit unit 110 is a logic circuit, such as a shift register or an address decoder.

The signal output from the photoelectric conversion element 102 of each pixel 101 is processed by the signal processing unit 103. The signal processing unit 103 includes a counter and a memory. The memory stores digital values.

The horizontal scanning circuit unit 111 inputs control pulses for selecting the columns in sequence to the signal processing unit 103 to read a signal from the memory of each pixel 101 in which digital signals are stored.

The signal line 113 receives a signal output from the signal processing unit 103 of a pixel 101 of the selected column selected by the vertical scanning circuit unit 110.

The signal output to the signal line 113 is output to a recording unit or circuit or a signal processing unit outside the photoelectric conversion apparatus 100 via an output circuit 114.

Referring to FIG. 2, the photoelectric conversion elements 102 in the pixel area 12 may be arranged in a one-dimensional manner. The function of the signal processing unit 103 does not necessarily have to be provided one for every photoelectric conversion element 102. For example, one signal processing unit may be shared by the plurality of photoelectric conversion elements 102, and signal processing may be performed in sequence.

As shown in FIGS. 2 and 3, the plurality of signal processing units 103 is arranged in the region overlapping with the pixel area 12 in plan view. The vertical scanning circuit unit 110, the horizontal scanning circuit unit 111, the reading circuit 112, the output circuit 114, and the control-pulse generating unit 115 are arranged so as to overlap with the space between the end of the sensor substrate 11 and the end of the pixel area 12 in plan view. In other words, the sensor substrate 11 includes the pixel area 12 and a non-pixel area 10d around the pixel area 12. The vertical scanning circuit unit 110, the horizontal scanning circuit unit 111, the reading circuit 112, the output circuit 114, and the control-pulse generating unit 115 are arranged in the area overlapping with the non-pixel area 10d in plan view.

Figure 4:
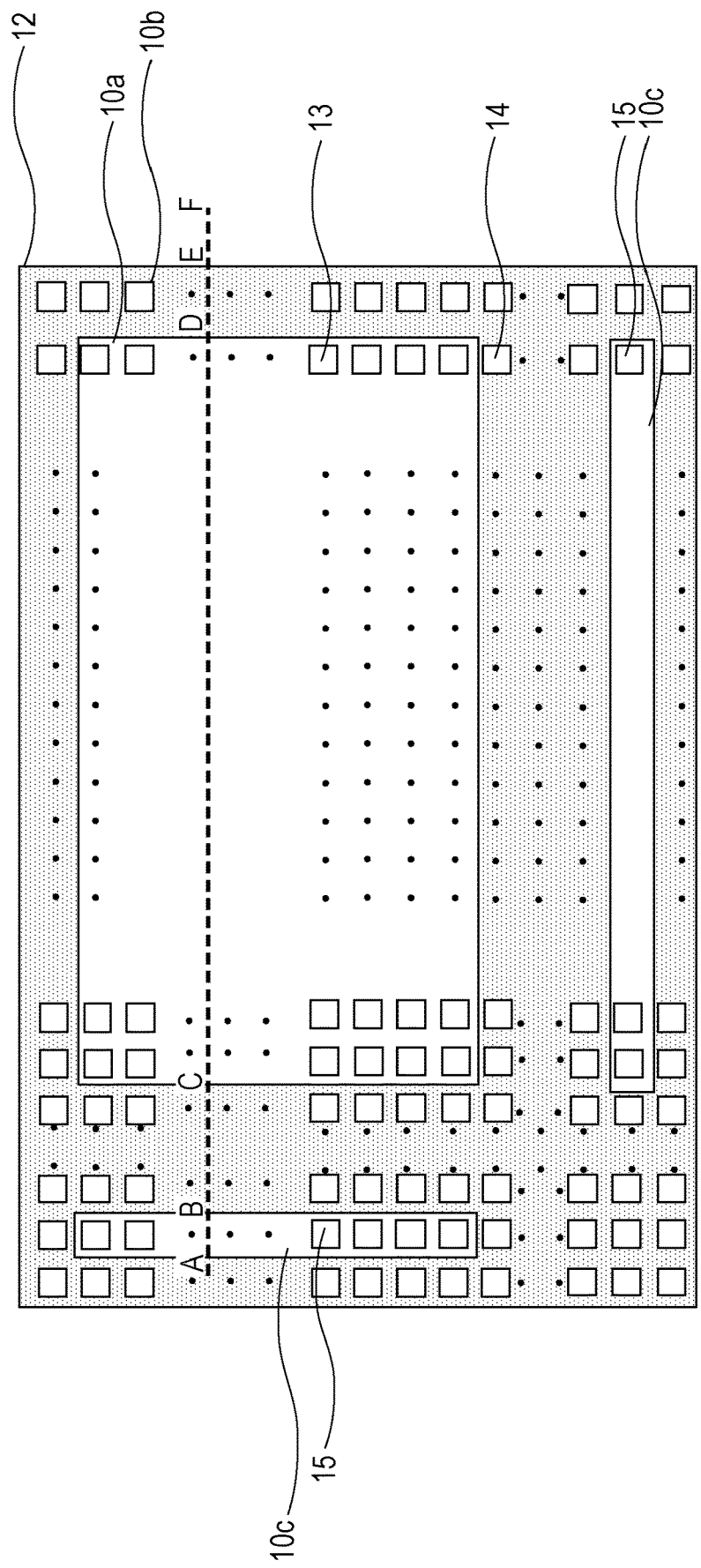
FIG. 4 is a schematic diagram of a photoelectric conversion apparatus according to a first embodiment.

The configuration of the pixel area 12 shown in FIG. 4 will be described. The pixel area 12 is an area in which pixels 101 capable of photoelectric conversion are disposed. In FIG. 4, the pixel area 12 includes a first area 10a, a second area 10b, and a third area 10c. The pixels 101 include effective pixels 13, dummy pixels 14, and optical black pixels (OB pixels) 15.

The first area 10a includes the effective pixels 13, each including the photoelectric conversion element 102 including an APD, arrayed in two dimensions in plan view. The effective pixels 13 are pixels that output a photon detection signal responsive to photon detection, typically, for forming an image. The numbers of rows and columns of pixels included in the first area 10a are not limited to particular numbers.

The second area 10b includes a plurality of dummy pixels 14 arrayed in two dimensions in plan view. In the planar configuration shown in FIG. 4, the dummy pixels 14 are disposed in the range of the pixel area 12 other than the first area 10a and the third area 10c to form the second area 10b. Since the dummy pixels 14 are arranged on the outermost periphery of the pixel area 12, the outer periphery of the second area 10b is the end of the pixel area 12. The dummy pixels 14 are photoelectric conversion elements each including an APD but do not output or generate photon detection signals to an external signal POUT.

The third area 10c includes a plurality of OB pixels 15 arrayed in two dimensions in plan view. The numbers of the rows and columns of the OB pixels 15 included in the third area 10c are not limited to particular numbers. At least part of the outer periphery of the third area 10c is in contact with the second area 10b. The OB pixels 15 are light-shielded pixels for outputting signals not responsive to external light. A plurality of third areas 10c may be provided in one pixel area 12. The pixel area 12 shown in FIG. 4 includes two island-like independent third areas 10c in the direction perpendicular to the first area 10a and in the direction parallel to the first area 10a. A portion of the third areas 10c may be further referred to as a fourth area.

The configuration of the photoelectric conversion element 102 will be described with reference to a range A-F of the cross-section of the photoelectric conversion apparatus 100 shown in FIG. 5. Reference signs A to F shown in FIG. 5 correspond to reference signs A to F in FIG. 4.

Figure 5:
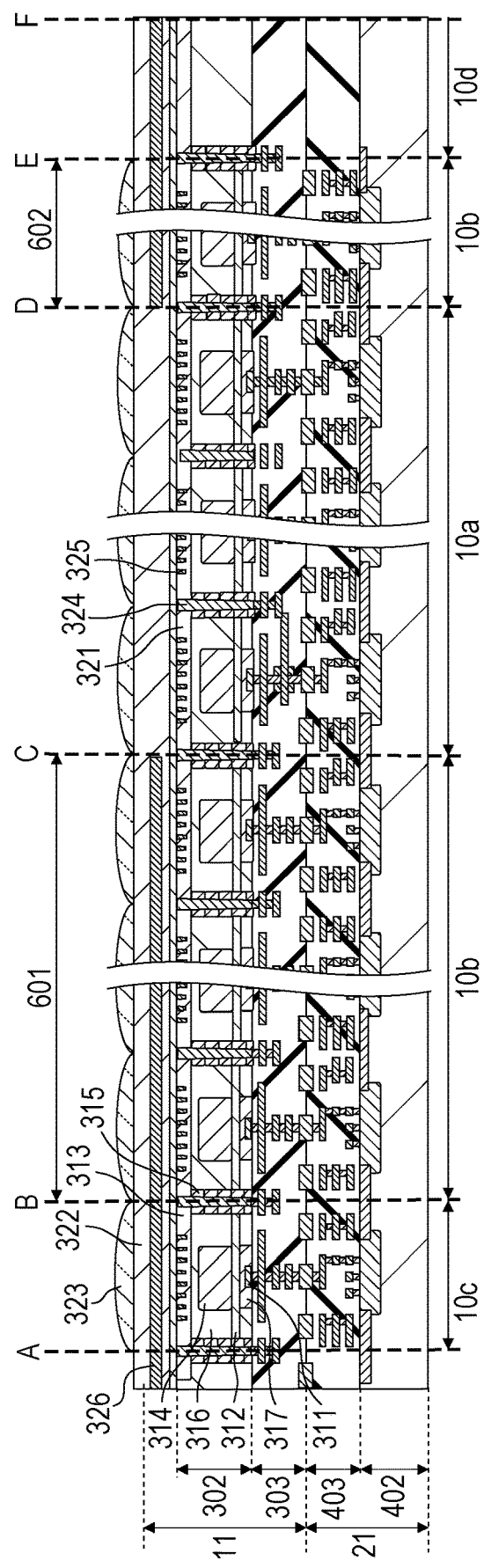
FIG. 5 is a cross-sectional view of the photoelectric conversion apparatus according to the first embodiment.

The photoelectric conversion apparatus 100 shown in FIG. 5 is a laminated photoelectric conversion apparatus in which two substrates, a sensor substrate 11 and a circuit substrate 21, are laminated and are electrically connected to each other. The sensor substrate 11 includes a first semiconductor layer 302 including the photoelectric conversion element 102, described later, and a first wiring structure 303. The circuit substrate 21 includes a second semiconductor layer 402 including the signal processing unit 103, described later, and a second wiring structure 403. The photoelectric conversion apparatus 100 includes the second semiconductor layer 402, the second wiring structure 403, the first wiring structure 303, and the first semiconductor layer 302 in this order.

A range A-B in FIG. 5 corresponds to one pixel of the photoelectric conversion element 102 of the photoelectric conversion apparatus 100. The range A-B is from one of pixel separating portions 324, described later, to the pixel separating portion 324 of the adjacent pixel 101. In other words, the range A-B is the range of one pixel 101 covered with a microlens, described layer.

The structure and function of the photoelectric conversion element 102 will be described. The photoelectric conversion element 102 includes an N-type first semiconductor region 311, an N-type fourth semiconductor region 314, an N-type sixth semiconductor region 316, and an N-type seventh semiconductor region 317. The photoelectric conversion element 102 further includes a P-type second semiconductor region 312, a P-type third semiconductor region 313, and a P-type fifth semiconductor region 315.

In this embodiment, the N-type first semiconductor region 311 is disposed in the vicinity of the surface opposite to the light-incident surface, and the N-type seventh semiconductor region 317 is disposed around the first semiconductor region 311 in the cross-section shown in FIG. 5. The P-type second semiconductor region 312 is disposed at a position overlapping with the first semiconductor region 311 and the seventh semiconductor region 317 in plan view. The N-type fourth semiconductor region 314 is also disposed at a position overlapping with the second semiconductor region 312 in plan view. The N-type sixth semiconductor region 316 is disposed in the vicinity of the sixth semiconductor region 316.

The first semiconductor region 311 has higher N-type impurity concentration than the fourth semiconductor region 314 and the seventh semiconductor region 317. A PN junction is formed between the P-type second semiconductor region 312 and the N-type first semiconductor region 311. The lower impurity concentration of the second semiconductor region 312 than the impurity concentration of the first semiconductor region 311 makes the entire second semiconductor region 312 a depletion layer region. The depletion layer region extends to part of the first semiconductor region 311, and an intense electric field is induced to the extended depletion layer region. This intense electric field causes avalanche multiplication in the depletion layer region extending to part of the first semiconductor region 311 to output an electric current based on the amplified charge as a signal charge. When the light incident on the photoelectric conversion apparatus 102 is photoelectrically converted to cause avalanche multiplication in the depletion layer region (avalanche multiplication region), the generated first conductivity type charge is collected to the first semiconductor region 311.

The surface of the semiconductor layer adjacent to the light-incident surface has a rough structure 325 with trenches. The rough structure 325 is surrounded by the P-type third semiconductor region 313 and scatters the light incident on the photoelectric conversion element 102. The incident light travels obliquely in the photoelectric conversion element 102. This provides an optical path length larger than the thickness of the semiconductor layer, allowing light with a longer wavelength than that without the rough structure 325 to be photoelectrically converted. The rough structure 325 prevents reflection of the incident light in the substrate, providing the effect of improving the photoelectric conversion efficiency of the incident light.

The fourth semiconductor region 314 and the rough structure 325 are overlapped with each other in plan view. The area of the overlap of the fourth semiconductor region 314 and the rough structure 325 in plan view is larger than the area of a portion of the fourth semiconductor region 314 not overlapping with the rough structure 325. The charge that is generated at a position far from the avalanche multiplication region between the first semiconductor region 311 and the fourth semiconductor region 314 takes a longer time to reach the avalanche multiplication region than the charge that is generated at a position near the avalanche multiplication region. This may increase timing jitter. Disposing the fourth semiconductor region 314 and the rough structure 325 so as to overlap in plan view increases the electric field in the deep portion of the photodiode to reduce the time to collect the charge generated at a position far from the avalanche multiplication region, thereby reducing timing jitter.

Covering the rough structure in three dimensions with the third semiconductor region 313 prevents generation of a thermostimulated charge at the interface of the rough structure. This decreases the dark count rate (DCR) of the photoelectric conversion element 102.

The pixels 101 are separated from each other by the pixel separating portion 324 with a trench structure, and the P-type fifth semiconductor region 315 around the pixel separating portion 324 separates the adjacent photoelectric conversion elements 102 with a potential barrier. Since the photoelectric conversion elements 102 are also separated by the potential of the fifth semiconductor region 315, the pixel separating portion 324 does not necessarily need to have the trench structure for pixel separation. The depth and the position of the pixel separating portion 324 are not limited to those of the structure shown in FIG. 5. The pixel separating portion 324 may be a deep trench isolation (DTI) passing through the semiconductor layer or not passing through the semiconductor layer. Metal may be embedded in the DTI to improve the light-shielding performance. The pixel separating portion 324 may enclose the entire periphery of the photoelectric conversion element 102 or may be disposed only opposite sides of the photoelectric conversion element 102.

The distance from the pixel separating portion 324 to the pixel separating portion 324 for the adjacent pixel 101 or the closest pixel 101 may be regarded as the size of one photoelectric conversion element 102. The distance d from the light-incident surface to the avalanche multiplication region satisfies $L\sqrt{2}/4 < d < L \times \sqrt{2}$, where L is the size of one photoelectric conversion element 102. If the size and the depth of the photoelectric conversion element satisfy this relational expression, the field intensity in the depth direction and the field intensity in the planar direction in the vicinity of the first semiconductor region 311 are approximately equal to each other. This reduces variations in charge collection time, thereby reducing occurrence of timing jitter.

The semiconductor layer further includes a pinning film 321, a planarizing film 322, and microlenses 323 on the light-incident surface. The light-incident surface may further include a filter layer (not shown). Examples of the filter layer include various optical filters, such as a color filter, an infrared cut filter, and a monochrome filter. The color filter may be a red, green, and blue (RGB) color filter or a red, green, blue, and white (RGBW) color filter.

This basic configuration also applies to the photoelectric conversion elements 102 arranged in a range B-E. A range A-C corresponding to the second area 10b and the third area 10c and a range D-F are provided with a light shielding portion 326 on the light-incident surface.

Correspondence between the plan view of the pixel area 12 shown in FIG. 4 and the cross-sectional view of the pixel area 12 shown in FIG. 5 will be described.

The range A-B in FIG. 4 and in the cross-section in FIG. 5 corresponds to the third area 10c. The light shielding portion 326 is disposed on the light-incident surface of the semiconductor layer to block light.

A range B-C in FIG. 4 and in the cross-section in FIG. 5 corresponds to the second area 10b. As for the OB pixels 15, the light shielding portion 326 is disposed on the light-incident surface of the semiconductor layer to block light. However, the dummy pixels 14 in the second area 10b do not necessarily need to be shielded from light. The dummy pixels 14 in the second area 10b do not output or generate signals responsive to light detection. Let 601 be the shortest distance from the end of the second area 10b at the boundary with the third area 10c to the end of the second area 10b at the boundary with the first area 10a.

A range C-D in FIG. 4 and in the cross-section in FIG. 5 corresponds to the first area 10a.

A range D-E in FIG. 4 and in the cross-section in FIG. 5 corresponds the second area 10b. Disposing the dummy pixels 14 in the outermost periphery of the pixel area 12 stabilizes the shape of the pixel area 12. Let 602 be the shortest distance from the end of the second area 10b at the boundary with the first area 10a to the end of the second area 10b, which is the outer peripheral end of the pixel area 12.

A range E-F in FIG. 4 and in the cross-section in FIG. 5 is the non-pixel area 10d of the sensor substrate 11.

Obliquely incident light of the light incident on the first area 10a can leak into the third area 10c. Since the third area 10c is shielded to output signals not responsive to external light, the leakage of light prevents generation of correct signals. Furthermore, the avalanche multiplication in the first area 10a can cause avalanche light emission. The avalanche light emission is a phenomenon in which a large number of electrons and holes caused by avalanche multiplication are rebound to charges with different polarities to generate photons. The photons generated by the avalanche light emission leak into the adjacent pixels to generate aliasing, leading to a decrease in image quality.

For this reason, this embodiment includes the second area 10b in which the dummy pixels 14 are arranged between the first area 10a in which the effective pixels 13 are disposed and the third area 10c in which the OB pixels 15 are disposed to sufficiently separate the first area 10a and the third area 10c from each other. This reduces light intrusion and photon leakage to the OB pixels 15.

Disposing the dummy pixels 14 between the first area 10a and the third area 10c and on the outer periphery of the pixel area 12 stabilizes the pixel array of the pixel area 12.

At least a few numbers of dummy pixels 14 should be arranged along the end of the pixel area 12. The number of dummy pixels 14 disposed between the first area 10a and the third area 10c is larger than the number of dummy pixels disposed between the first area and the end of the pixel area 12. The dummy pixels 14 ten times or more than the dummy pixels 14 disposed at the end of the pixel area 12 may be disposed between the first area 10a and the third area 10c. Specifically, 20 pixels or more may be disposed between the first area 10a and the third area 10c, but the number of dummy pixels 14 is not limited to 20 or more. The shortest distance 601 between the outer periphery of the first area 10a and the outer periphery of the third area 10c is longer than the shortest distance 602 between the outer periphery of the first area 10a and the outer periphery of the second area 10b. In other words, the number of pixels disposed in the shortest distance 601 in plan view is larger than the number of pixels disposed in the shortest distance 602 in plan view. In this embodiment, the shortest distance 601 between the outer periphery of the first area 10a and the outer periphery of the third area 10c is ten times or more away from the shortest distance 602 between the outer periphery of the first area 10a and the outer periphery of the second area 10b. Also in a case where a plurality of third areas 10c is disposed in the pixel area 12, this relationship between the first area 10a and each third area 10c holds.

In other words, the second area 10b includes a first portion in contact with the end of the pixel area 12 and a second portion. The first portion of the second area 10b, the first area 10a, the second portion of the second area 10b, and the third area 10c are arranged from the end of the pixel area 12, for example, in the vertical direction.

In this case, the vertical width of the second portion of the second area 10b is larger than the vertical width of the first portion of the second area 10b. In the case where the second area 10b includes a third portion in contact with the end of the pixel area 12, for example, the first area 10a and the third portion of the second area 10b are arranged in the lateral direction crossing the vertical direction in which the first portion and the second portion of the second area 10b are arranged. In this case, the vertical width of the second portion of the second area 10b is larger than the lateral width of the third portion of the second area 10b.

In FIG. 4, the first area 10a, the second area 10b, and the third area 10c are rectangular. However, the shapes of the areas 10a, 10b, and 10c are not limited to be rectangular and may be circular or polygonal, for example.

Figure 6:
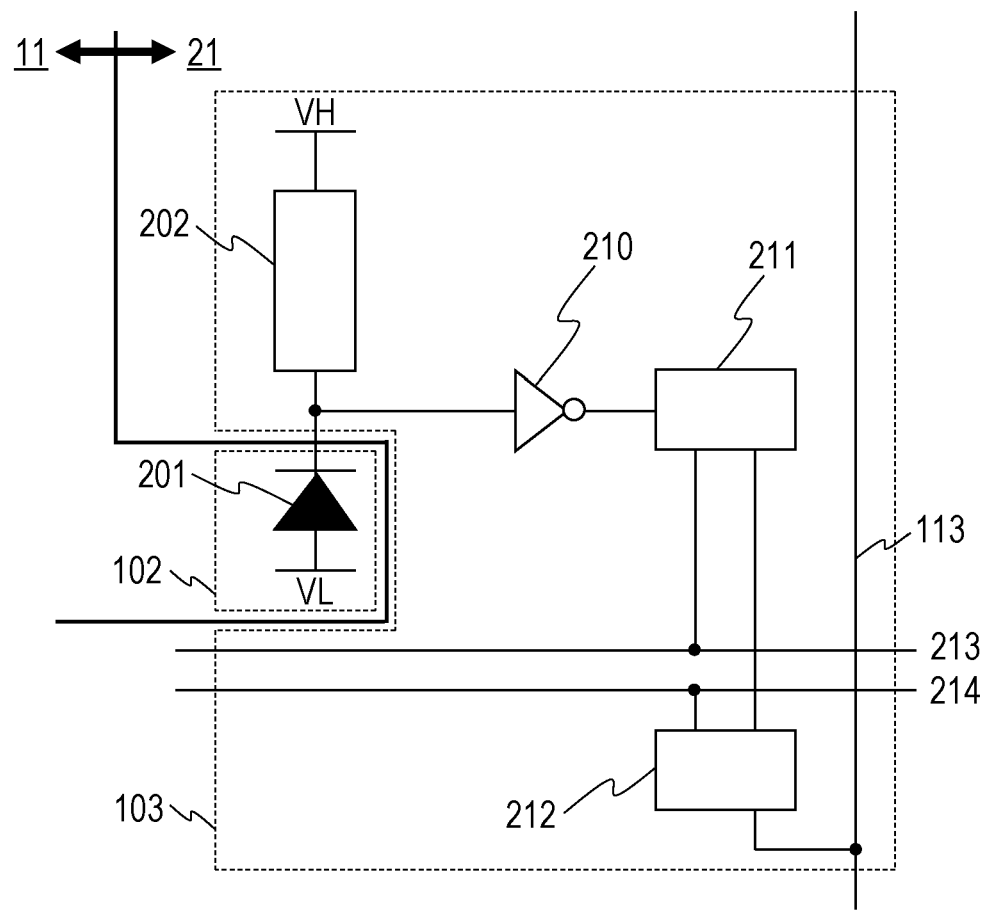
FIG. 6 is a block diagram of an example of the configuration of a pixel circuit of the photoelectric conversion apparatus according to the first embodiment.

FIG. 6 is an example of a block diagram of the effective pixel 13 including an equivalent circuit.

The APD 201 generates a charge pair according to the incident light by photoelectrical conversion. The anode of the APD 201 is supplied with a voltage VL (a first voltage). The cathode of the APD 201 is supplied with a voltage VH (a second voltage) higher than the voltage VL supplied to the anode. The anode and the cathode are supplied with a reverse bias voltage so that the APD 201 performs an avalanche multiplication operation. By supplying such a voltage, the charge generated by incident light causes avalanche multiplication to generate an avalanche current.

In application of a reverse bias voltage, there are a Geiger mode in which the APD operates with the potential difference between the anode and the cathode larger than the breakdown voltage and a linear mode in which the APD operates with the potential difference between the anode and the cathode near or below the breakdown voltage.

The APD operated in the Geiger mode is referred to as a single-photon avalanche diode (SPAD). For example, the voltage VL (the first voltage) is at −30 V, and the voltage VH (the second voltage) is at 1 V. The APD 201 may be operated in the linear mode or in the Geiger mode. The SPAD may be used because the SPAD applies a larger potential difference than the APD that is in the linear mode, having a significant effect of withstand voltage.

A quench element 202 is connected to a power source that supplies the voltage VH, which is a driving voltage, and to the APD 201. The quench element 202 functions as a load circuit (a quench circuit) at signal multiplication using avalanche multiplication to reduce the voltage to be supplied to the APD 201 thereby reducing avalanche multiplication (a quench operation). The quench element 202 functions to return the voltage to be supplied to the APD 201 to the voltage VH by passing a current corresponding to the voltage drop due to the quench operation (a recharge operation).

The signal processing unit 103 includes a waveform shaping unit or circuit 210, a counter circuit 211, and a selection circuit 212. In this specification, the signal processing unit 103 may include any of the waveform shaping unit 210, the counter circuit 211, and the selection circuit 212.

The waveform shaping unit 210 shapes a change in the potential of the cathode of the APD 201 obtained at photon detection and outputs a pulse signal. One example of the waveform shaping unit 210 is an inverter circuit. FIG. 6 illustrates an example in which one inverter is used as the waveform shaping unit 210. Alternatively, a circuit in which a plurality of inverters is connected in series or another circuit having a waveform shaping effect may be used.

The counter circuit 211 counts the number of pulse signals output from the waveform shaping unit 210 and stores the count value. When a control pulse pRES is supplied through a drive line 213, the signals stored in the counter circuit 211 are reset.

The selection circuit 212 is supplied with a control pulse pSEL from the vertical scanning circuit unit 110 in FIG. 3 through a drive line 214 in FIG. 6 to switch between the electrical connection and disconnection between the counter circuit 211 and the signal line 113. The selection circuit 212 includes, for example, a buffer circuit for outputting signals.

The electrical connection may be switched using a switch, such as a transistor, between the quench element 202 and the APD 201 or between the photoelectric conversion element 102 and the signal processing unit 103. Likewise, the voltage VH or the voltage VL supplied to the photoelectric conversion element 102 may be electrically switched using a switch, such as a transistor.

This embodiment shows a configuration using the counter circuit 211. The photoelectric conversion apparatus 100 may include a time-to-digital converter (hereinafter referred to as TDC) and a memory in place of the counter circuit 211 to obtain pulse detection timing. In this case, the generation timing of the pulse signal output from the waveform shaping unit 210 is converted to a digital signal by the TDC. In measuring the timing of the pulse signal, the TDC is supplied with a control pulse pREF (a reference signal) from the vertical scanning circuit unit 110 in FIG. 3 via a drive line. The TDC obtains signals, as digital signals, indicating the relative input timing of the signals output from the individual pixels via the waveform shaping unit 210 with respect to the control pulse pREF.

Figure 7A:
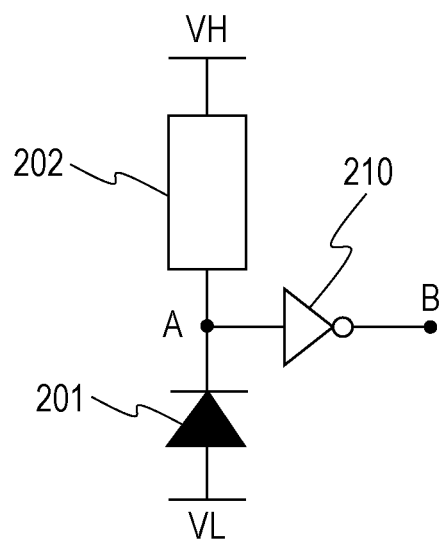
FIG. 7A is a block diagram of the pixel circuit of the photoelectric conversion apparatus according to the first embodiment.
Figure 7B:
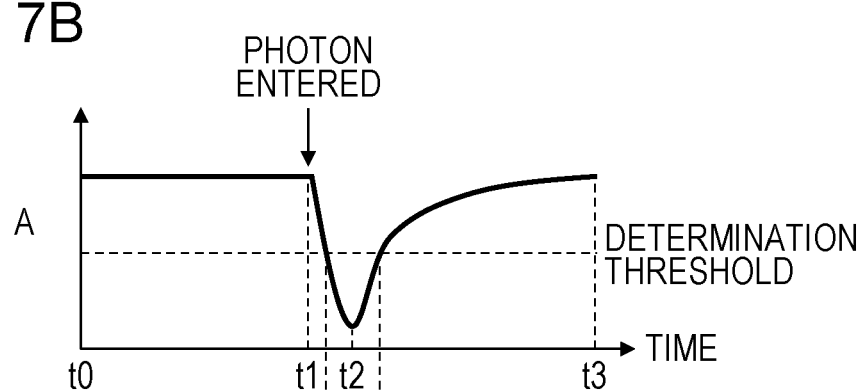
FIGS. 7B and 7C are timing charts showing the driving of the pixel circuit of the photoelectric conversion apparatus according to the first embodiment.
Figure 7C:
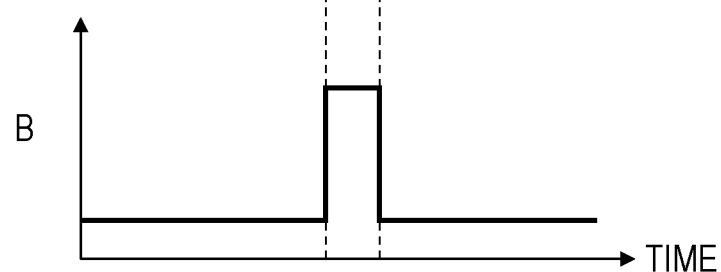

FIGS. 7A to 7C are diagrams schematically showing the relationship between the operation of the APD 201 and the output signal.

FIG. 7A is a diagram of the APD 201, the quench element 202, and the waveform shaping unit 210 in FIG. 6, where node A is the input side, and node B is the output side of the waveform shaping unit 210. FIG. 7B shows a change in the waveform at node A in FIG. 7A. FIG. 7C shows a change in the waveform at node B in FIG. 7A.

The APD 201 in FIG. 7A is subjected to a potential difference VH-VL during the period from time to to time t1. When a photon enters the APD 201 at time t1, avalanche multiplication occurs in the APD 201, so that an avalanche multiplication current flows through the quench element 202 to drop the voltage at node A. When the amount of voltage drop is further increased to decrease the difference in potential applied to the APD 201, the avalanche multiplication of the APD 201 stops as at time t2, so that the voltage level at node A does not drop above a certain value. Thereafter, during the period from time t2 to time t3, a current compensating for the voltage drop flows to node A from the voltage VL, and, at time t3, the potential level at node A is statically determined to the initial potential level. At that time, the portion of the output waveform at node A exceeding a threshold is shaped by the waveform shaping unit 210 and is output as a signal from node B.

Figure 8A:
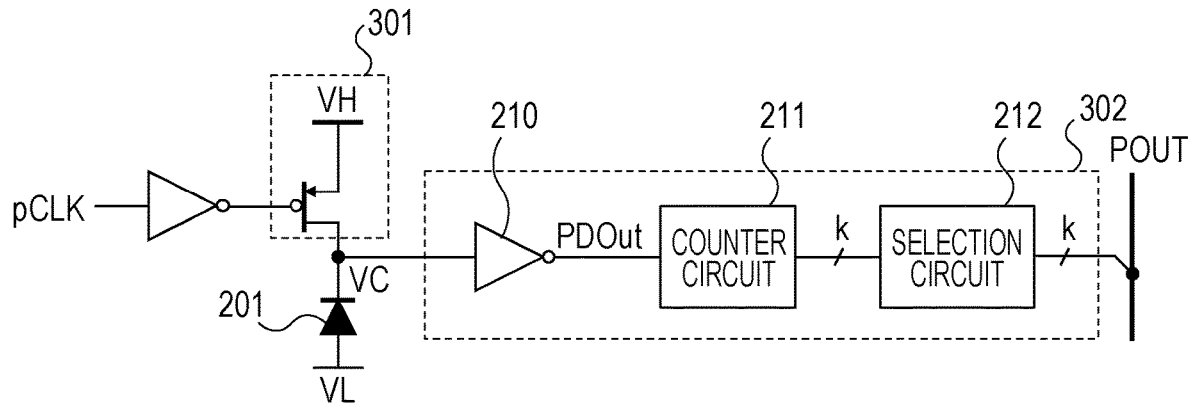
FIGS. 8A to 8C are block diagrams of examples of the configuration of the pixel circuit of the photoelectric conversion apparatus according to the first embodiment.
Figure 8B:
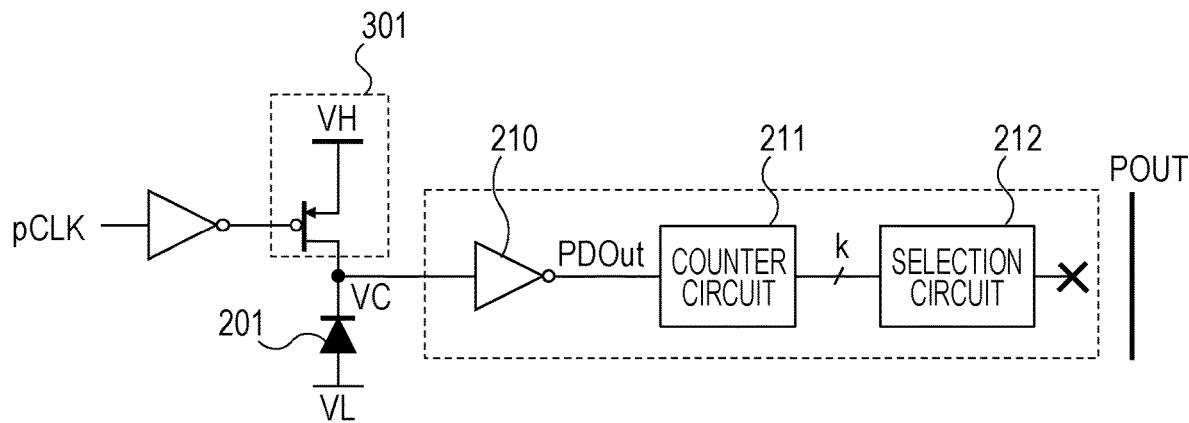
Figure 8C:
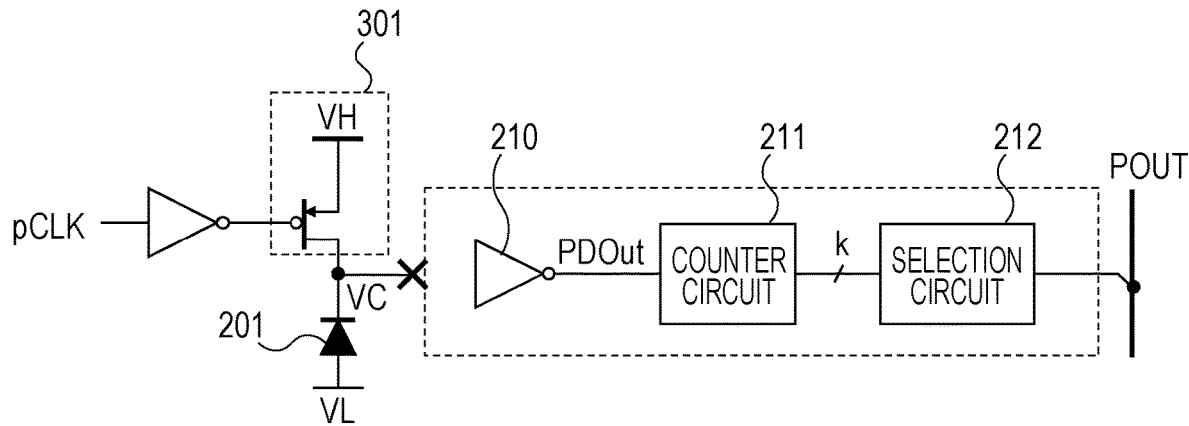

FIGS. 8A to 8C are diagrams illustrating images of the circuit configuration of the photoelectric conversion apparatus 100 according to this embodiment. FIG. 8A illustrates the connection relationship among the effective pixel 13 or the OB pixel 15, the signal processing unit 103, and the signal line 113. FIGS. 8B and 8C illustrate the connection relationship among the dummy pixel 14, the signal processing unit 103, and the signal line 113. The effective pixel 13 is a pixel that outputs a photon detection signal to the signal line 113. In other words, the effective pixel 13 is used for light detection. The dummy pixel 14 is a pixel that outputs no photon detection signal to the signal line 113. In other words, the dummy pixel 15 is used for a purpose other than light detection.

Figure 9:
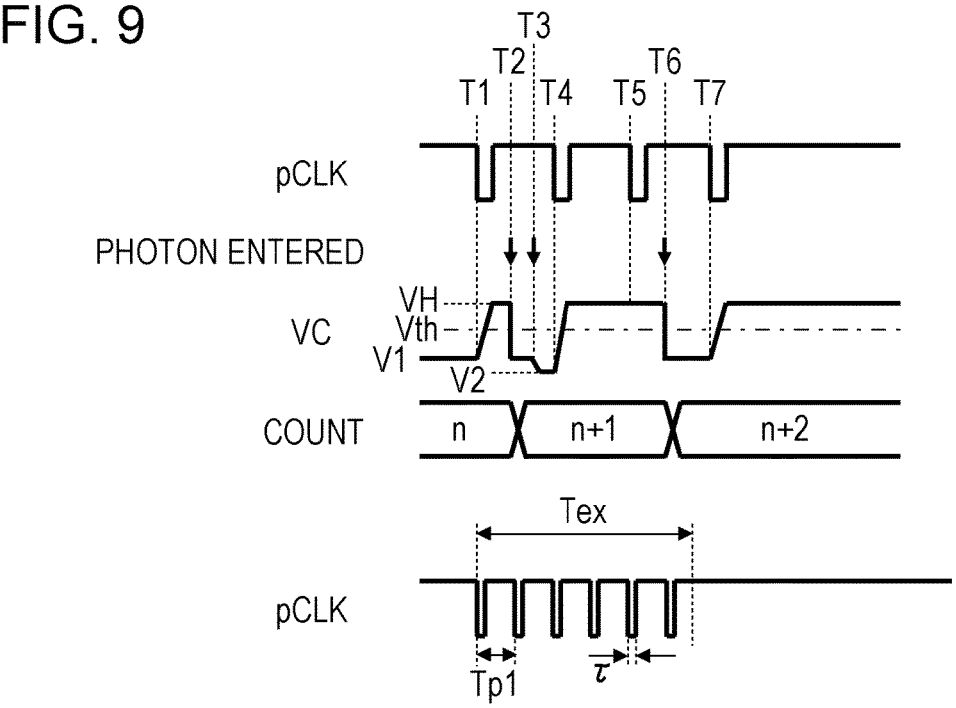
FIG. 9 is a timing chart showing the driving of the pixel circuit of the photoelectric conversion apparatus according to the first embodiment.

Referring to FIG. 8A and FIG. 9, the operation of the effective pixel 13 will be described.

The effective pixel 13 includes an APD 201, a recharge circuit 301, and a processing circuit 302. A clock signal pCLK drives the recharge circuit 301 by going to Low to recharge the APD 201 to a bias voltage to allow the APD 201 to perform avalanche multiplication in the Geiger mode. The recharge circuit 301 may be any circuit capable of switching the resistance between the APD 201 and the power source, for example, a P-type metal oxide semiconductor (MOS) transistor. When the clock signal pCLK goes to High after the APD 201 is recharged to a bias voltage that allows avalanche multiplication, the cathode terminal and the power source voltage VH are isolated from each other, so that the cathode terminal enters a floating state. When a photon is incident on the APD 201 to generate photocharge to cause avalanche multiplication, the cathode voltage VC drops to decrease the difference between the anode voltage VL and the cathode voltage VC below the breakdown voltage of the APD 201. The change in cathode voltage VC is detected by the processing circuit 302, so that the photon is detected as a signal. The effective pixel 13 outputs the result of photon detection during the exposure period from the processing circuit 302 to the signal line 113, thereby reading the photon detection result of the pixel.

FIG. 9 is a timing chart showing an example of the driving of the effective pixel 13 during an exposure period Tex. Referring to FIG. 9, changes in the cathode voltage VC by control of the clock signal pCLK and the basic photon count operation will be described. Clock recharge driving for controlling the number of photons detected during the exposure period Tex by bringing the clock signal pCLK to Low periodically during the exposure period Tex will also be described.

When the clock signal pCLK goes to Low at time T1, the cathode voltage VC is recharged from a potential V1 to a potential VH. The voltage applied to the APD 201 at that time is potential VH-potential VL. Assuming that the breakdown voltage of the APD 201 is potential V1-potential VL, a voltage is applied to the APD 201 in excess of the breakdown voltage by the potential difference of potential VH-potential V1, so that the APD 201 is capable of avalanche multiplication in the Geiger mode.

When a photon enters the APD 201 at time T2, avalanche multiplication occurs in the APD 201 to decrease the cathode voltage VC from the potential VH to the potential V1. The bias voltage of the APD 201 at that time is potential V1-potential VL to drop to a voltage lower than the breakdown voltage. The processing circuit 302 detects the change in the cathode voltage VC to a threshold voltage Vth or less and counts up the count value of the counter from n to n+1.

Next, a photon enters at time T3, no avalanche multiplication in the Geiger mode occurs because the APD 201 is subjected to a bias voltage less than the breakdown voltage. However, the potential difference between the potential VL and the potential V1 is a reverse bias voltage less than the breakdown voltage, and a reverse current triggered by photocharge is generated, so that the cathode voltage VC drops to a potential V2 lower than the potential V1. The drop of the cathode voltage VC to a voltage lower than or equal to the breakdown voltage due to the reverse current does not reflect to counting up of the counter.

Since the clock signal pCLK goes to Low at time T4, the cathode voltage VC is recharged to the potential VH again. The clock signal pCLK goes to Low at time T5, but the cathode voltage VC does not change because it has been recharged to the potential VH.

When a photon enters at time T6, avalanche multiplication occurs to decrease the cathode voltage VC, and the count value of the counter is counted up to n+2. Thus, the periodical recharge operation is referred to as clock recharge driving, in which the number of times of photon detection during the exposure period is controlled to the upper limit of the number of recharge operations.

The difference of the dummy pixel 14 from the effective pixel 13 is that the APD 201, the processing circuit 302, and the signal line 113 are not connected, as shown in FIGS. 8B and 8C. For this reason, even if a photon enters in a state in which the APD 201 is capable of avalanche multiplication according to the clock signal pCLK to change the cathode voltage VC, the result of photon detection cannot be output to the signal line 113.

As shown in FIGS. 8B and 8C, the APD 201 of the dummy pixel 14 is not connected to the signal line 113, so that the APD 201 does not need to perform recharge for photon detection. However, if the cathode terminal is kept at a floating state for a long time, a voltage drop phenomenon as at time T3 in FIG. 9 may occur a plurality of times, so that the cathode voltage VC may continue to drop. For this reason, this embodiment prevents the drop of the cathode voltage VC by performing a recharge operation also in the dummy pixel 14. If the input to the dummy pixel 14 is kept at High, the cathode terminal of the APD 201 is kept in the floating state. If the cathode terminal is kept in the floating state after avalanche multiplication occurs once, as described in the description of FIG. 9, avalanche multiplication in the Geiger mode is not generated, but a reverse current caused by charges, such as a photocharge, can flow. In the example shown in FIG. 9, the potential of the cathode terminal decreases from the potential V1 to the potential V2. If the non-recharge state continues, the potential at the cathode terminal continues to drop every time charges are generated. Eventually, a potential exceeding the withstand voltage of a circuit element to which the potential of the cathode voltage VC is applied, such as the processing circuit 302, may be applied to damage the circuit element.

Thus, in the first embodiment, the first area 10a in which the effective pixels 13 are disposed and the third area 10c in which the OB pixels 15 are disposed are sufficiently separated from each other by the second area 10b in which the dummy pixels 14 are disposed. This reduces intrusion of light and leakage of photons to the OB pixels 15, thereby preventing a decrease in image quality. Periodical recharge of the dummy pixels 14 prevents the potential change of the APD terminals of the dummy pixels 14.

Second Embodiment

A photoelectric conversion apparatus according to this embodiment will be described with reference to FIGS. 10A and 10B and FIG. 11. Components common to FIGS. 1 to 9 are denoted by the common reference signs, and differences from the first embodiment will be mainly described. The photoelectric conversion apparatus according to this embodiment differs from the first embodiment in the driving of the dummy pixels 14.

Figure 10A:
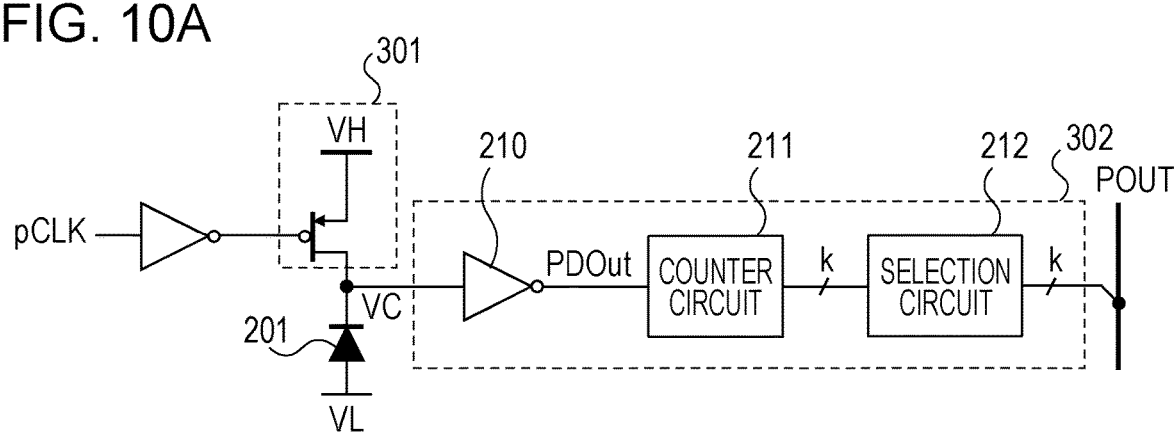
FIGS. 10A and 10B are block diagrams of examples of the configuration of a pixel circuit of a photoelectric conversion apparatus according to a second embodiment.

FIG. 10A illustrates the configuration of the effective pixel 13 with a configuration common to FIG. 8A.

Figure 10B:
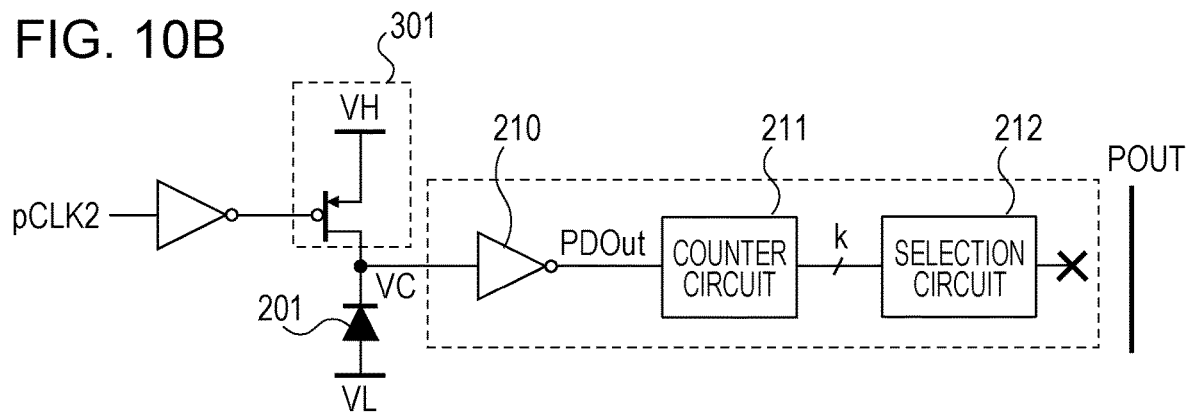

FIG. 10B illustrates the circuit configuration of the dummy pixel 14 of the photoelectric conversion apparatus according to this embodiment. In the first embodiment, the timing the recharge of the APD 201 is controlled according to a control signal pCLK common between the effective pixels 13 and the dummy pixels 14. In the second embodiment, the dummy pixel 14 is recharged at any timing regardless of the recharge timing of the effective pixel 13. For example, the dummy pixel 14 is controlled by a second control signal pCLK2 in a different phase from the control signal pCLK for the effective pixel 13.

Figure 11:
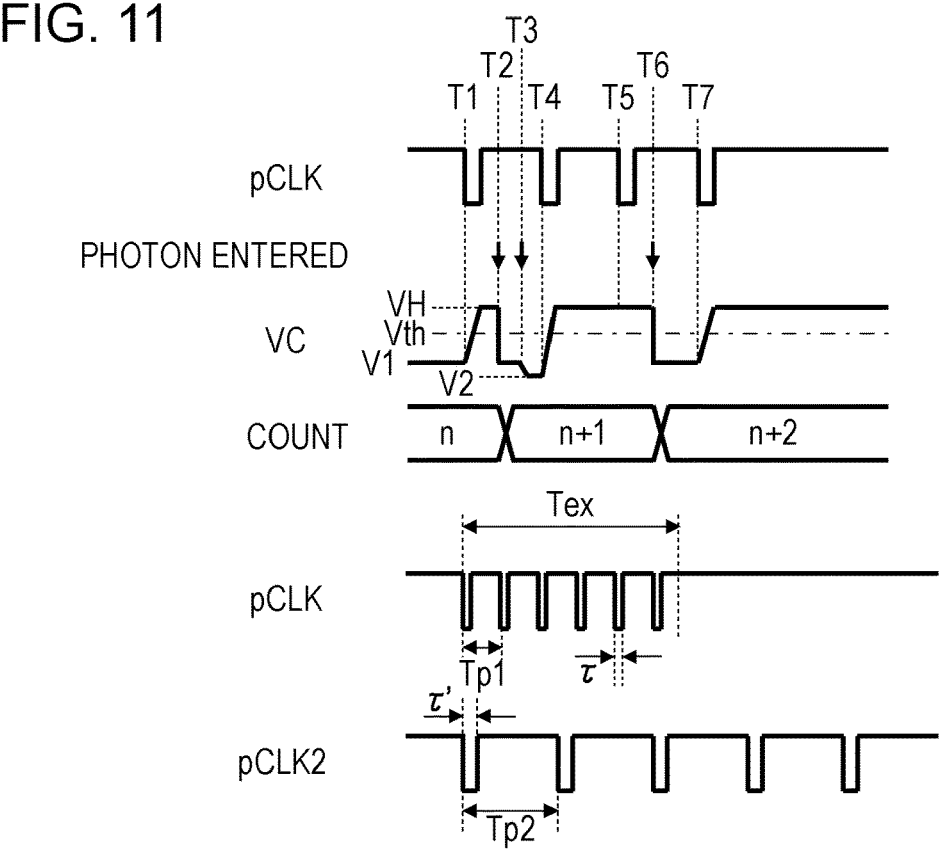
FIG. 11 is a timing chart showing the driving of the pixel circuit of the photoelectric conversion apparatus according to the second embodiment.

As shown in FIG. 11, the effective pixel 13 is periodically recharged with a pulse width t during the exposure period Tex according to the clock signal pCLK at intervals of Tp1.

The dummy pixel 14 is recharged according to a control signal pCLK2 at intervals of Tp2 with a fixed pulse width of t' regardless of whether in or out of the exposure period Tex.

Here, the exposure period Tex is longer than the pulse width t'. Not setting the pulse width t' unnecessarily long allows the frequency of current flow through the APD 201 of the dummy pixel 14 to be lower than that of the effective pixel 13, thereby reducing the power consumption of the dummy pixel 14.

The pulse width t and the pulse width t' may be equal to or different from each other. For the effective pixel 13, the pulse width t may be as small as possible to reduce the recharge time. However, for the dummy pixel 14, the pulse width t' may be larger than the pulse width t. The pulse width t of the effective pixel 13 needs to correspond to a period sufficient for the cathode voltage VC to be recharged to a predetermined voltage. In contrast, the dummy pixel 14 does not need to take variations in recharged cathode voltage VC into account. For this reason, t' can be decreased within the range in which the effect of recharge is given, reducing the power consumption. Setting the pulse width t and the pulse width t' equal allows part of the wires for use in generating and transmitting the pulses of the clock signal pCLK and the control signal pCLK2 to be shared.

The recharge period Tp1 of the effective pixel 13 is less than or equal to the recharge period Tp2 of the dummy pixel 14. This relationship allows the power consumption of the dummy pixel 14 to be reduced by reducing the number of pulses per unit time of the recharge signal of the dummy pixel 14 while preventing damage to the circuit element due to a drop in the cathode voltage VC.

Third Embodiment

The arrangement of the areas in the pixel area 12 is not limited to that shown in FIG. 4.

Figure 12:
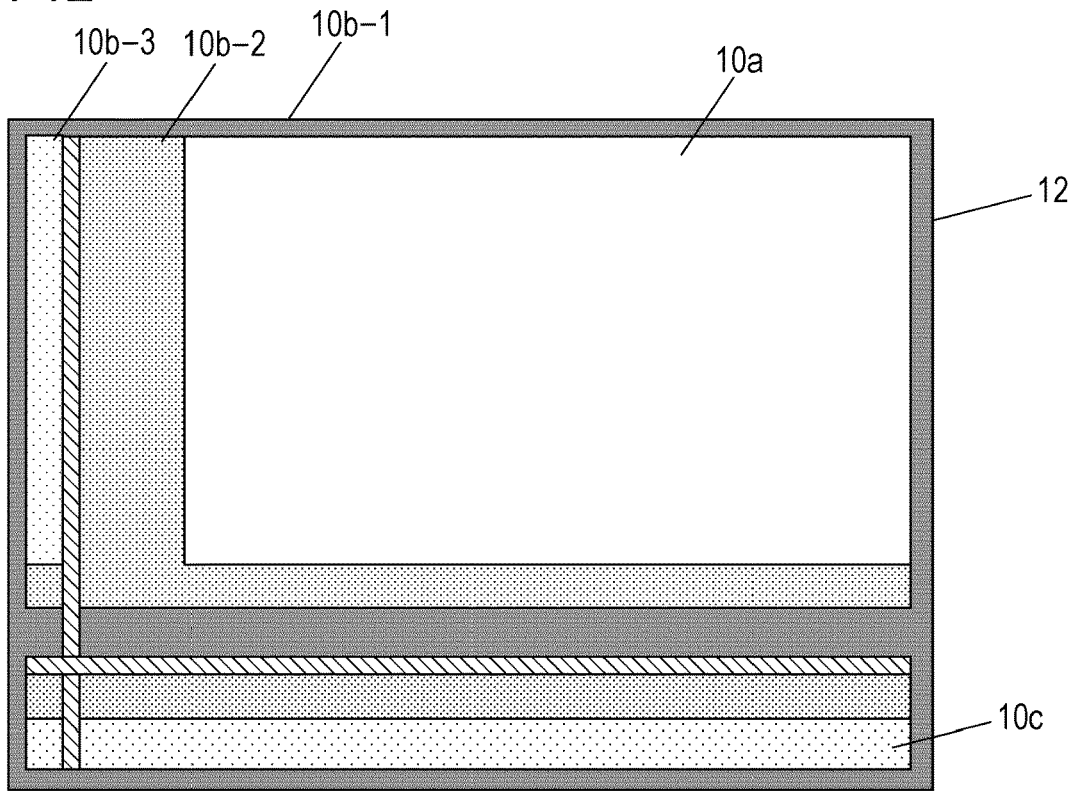
FIG. 12 is a schematic diagram of a pixel circuit of a photoelectric conversion apparatus according to a third embodiment.

FIG. 12 illustrates an example of the planar layout of the pixel area 12. In the layout shown in FIG. 12, the second area 10b is further divided into three kinds of a second area 10b-1, a second area 10b-2, and a second area 10b-3. The dummy pixels 14 configured not to output signals, described in the first and second embodiments, are disposed in the second area 10b-1. Dummy pixels 16 with a different configuration from the first and second embodiments, which are controlled so as not to output signals, are disposed in the second area 10b-2. Test pixels 17 for use in checking whether the circuit is normal are disposed in the second area 10b-3. In other words, the pixels disposed in the second area 10b are used for purposes other than light detection.

The dummy pixels 16 should be configured not to output signals based on photon detection even if electrically connected to the signal line 113. Depending on the control situation, such dummy pixels 16 can output signals based on photon detection, for example, can be used to check leakage of light from the effective pixels 13 to the OB pixels 15 or the influence of avalanche light emission.

Figure 13A:
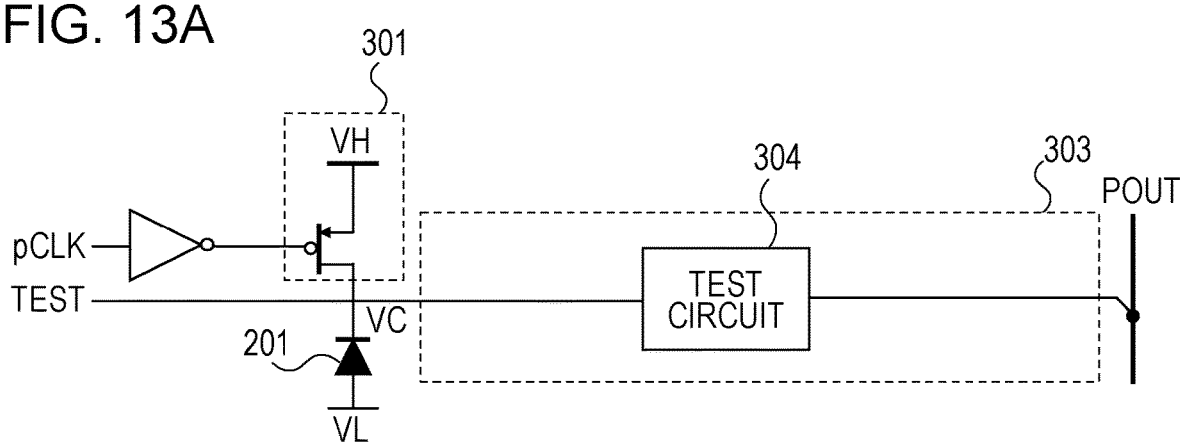
FIGS. 13A to 13C are block diagrams of examples of the configuration of a pixel circuit of the photoelectric conversion apparatus according to the third embodiment.
Figure 13B:
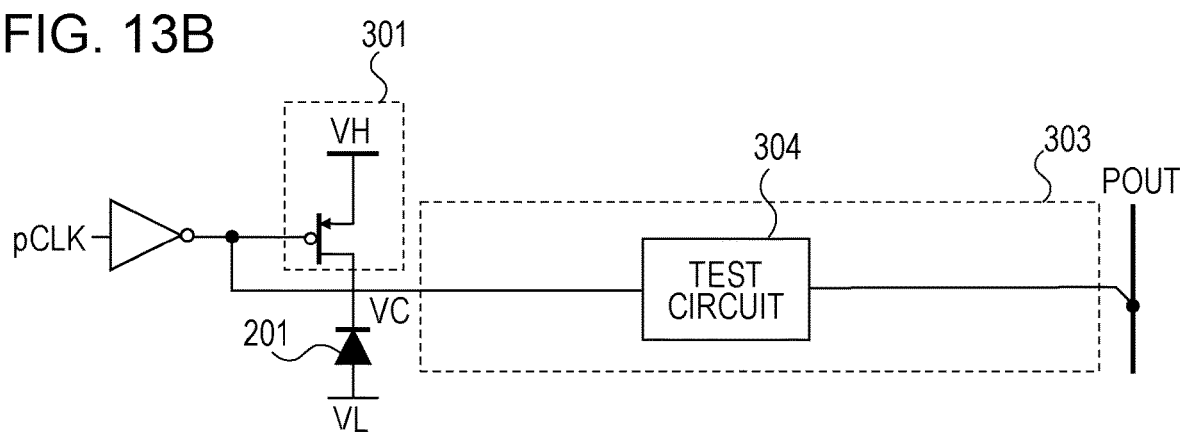
Figure 13C:
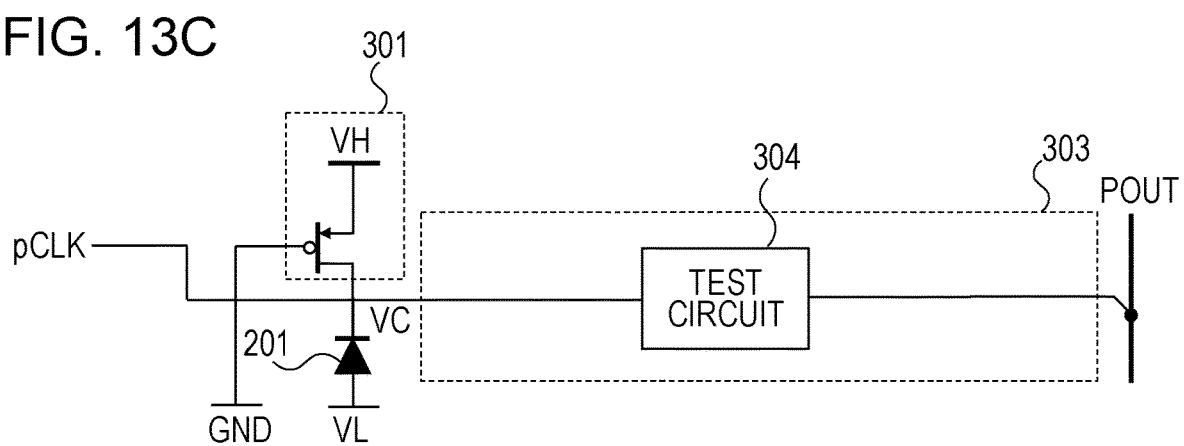

FIGS. 13A to 13C schematically show the configuration of the test pixel 17. The test pixel 17 differs from the dummy pixel 14 in that the test pixel 13 is connected to an external signal POUT. The test pixel 17 includes a test processing circuit 303 in place of the processing circuit 302 of the dummy pixel 14. The test processing circuit 303 receives the output of the cathode voltage VC of the APD 201 but does not output information on a change in the cathode voltage VC, that is, photon detection information, to the signal line 113. In other words, the test pixel 17 is used for a purpose other than light detection.

The test processing circuit 303 includes a test circuit 304 and outputs a signal for checking the normality of the circuit. The test processing circuit 303 receives a test signal TEST. In other words, the test processing circuit 303 outputs a signal based on an input from an input node different from an output node of the avalanche photodiode. The test signal TEST may change with time or may be fixed. The test signal TEST may be generated outside or inside the test pixel 17. For example, outputting a fixed value from the test circuit 304 allows checking the normality of the output path in FIG. 13A from the test processing circuit 303 to the external signal POUT.

The test processing circuit 303 may have a function for receiving the control signal pCLK and counting the number of pulses of the control signal pCLK with the test circuit 304 to check the normality of the control signal pCLk, as shown in FIGS. 13B and 13C. In this case, the signal input to the recharge circuit 301 of the test pixel 17 may be pCLK as shown in FIG. 13B or a signal other than pCLK as shown in FIG. 13C. Although FIG. 13C shows the ground voltage as an example of a fixed value other than pCLK, the signal may be a clock signal with different phase from that of pCLK.

Fourth Embodiment

Figure 14A:
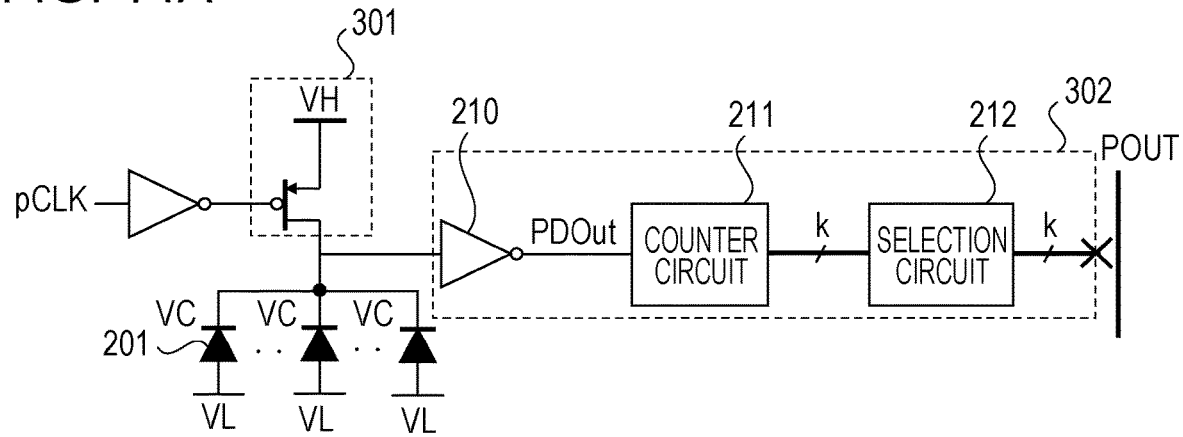
FIGS. 14A to 14C are block diagrams of examples of the configuration of a pixel circuit of a photoelectric conversion apparatus according to a fourth embodiment.
Figure 14B:
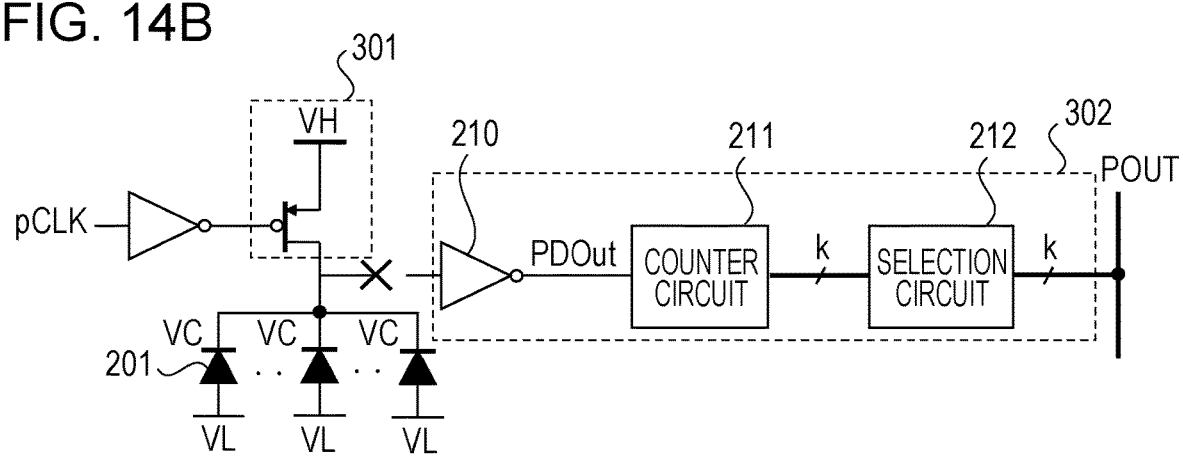
Figure 14C:
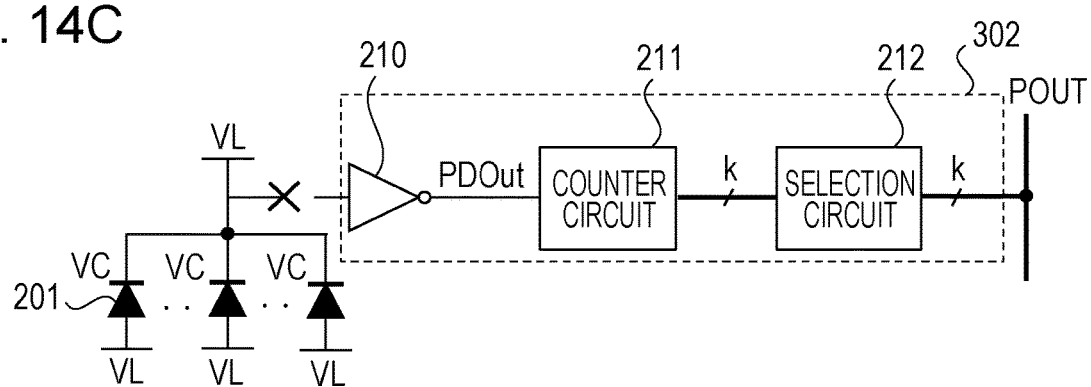

A photoelectric conversion apparatus according to this embodiment differs from the photoelectric conversion apparatus according to the first embodiment in the configuration of the dummy pixels 14. Example configurations of the dummy pixel 14 of the photoelectric conversion apparatus according to the first embodiment are shown in FIGS. 8B and 8C. FIGS. 14A to 14C show example configurations of the dummy pixels 14 according to this embodiment.

The dummy pixels 14 shown in FIGS. 14A and 14B are characterized in that a plurality of APDs 201 is connected in parallel to one recharge circuit 301. FIGS. 14A and 14B show three APDs 201 connected as an example. However, the number of APDs 201 connected in parallel is not limited to three. Although the APD 201 and the waveform shaping unit 210 in the dummy pixel 14 shown in FIG. 14A are connected, the APD 201 and the waveform shaping unit 210 do not have to be connected, as shown in FIG. 14B. The dummy pixel 14 does not output a signal based on the charge generated in the APD 201 to the signal line 113. In other words, the dummy pixel 14 is a pixel used for purposes other than light detection.

The recharge timing of the recharge circuit 301 of the dummy pixel 14 may be controlled by the control signal pCLK common to the effective pixel 13 and the dummy pixel 14 as in the first embodiment. The recharge circuit 301 of the dummy pixel 14 may be recharged at any timing regardless of the recharge timing of the recharge circuit 301 of the effective pixel 13 as shown in the second embodiment.

In this embodiment, connecting one recharge circuit 301 to a plurality of dummy pixels 14 allows reducing the total number of recharge circuits 301 in the entire pixel area 12, leading to power saving.

The dummy pixel 14, which receives a small amount light, requires less frequent recharging. For example, at the boundary between the first area 10a and the second area 10b, light is prone to leak from the first area 10a to the second area 10b even if the second area 10b is shielded. For this reason, the frequency of photoelectric conversion in the dummy pixel 14 due to the leakage light is relatively high, and the frequency of necessary recharging of the recharge circuit 301 is also high. For example, the dummy pixel 14 at C or D in FIG. 5 is located at the boundary between the light-shielded area and the effective pixel area. For this reason, the number of APDs 201 connected in parallel to one recharge circuit 301 in the dummy pixel 14 is preferably about two or three. In contrast, the farther the dummy pixel 14 is located from the unshielded first area 10a, the more light received is attenuated. For this reason, the number of APDs 201 connectable in parallel to one recharge circuit 301 in such a dummy pixel 14 may be larger than that of dummy pixels 14 around the boundary. For example, the number of APDs 201 connectable in parallel to one recharge circuit 301 of the dummy pixel 14 at B in FIG. 4 is larger than that of the dummy pixel 14 at C or D. Changing the number of APDs 201 connected in parallel according to the arrangement of the dummy pixels 14, allowing reducing the number of recharge circuits 301 in the entire pixel area 12, leading to further power saving. In other words, of the dummy pixels 14, the number of avalanche photodiodes of the first dummy pixels distant from the boundary between the first area 10a and the second area 10b is larger than the number of avalanche photodiodes of the second dummy pixels near to the boundary between the first area 10a and the second area 10b.

Avalanche multiplication should not occur in the dummy pixel 14 to prevent the cathode voltage VC from decreasing with time. In other words, no inverse vias voltage should be applied to the dummy pixel 14. For this reason, further power saving can be achieved by using a configuration in which the dummy pixel 14 receives a fixe fixed voltage and does not include the recharge circuit 301. For example, as shown in FIG. 14C, lines may be provided so that the voltage VL is applied to both the cathode terminal and the anode terminal of each APD 201.

Fifth Embodiment

Figure 15:
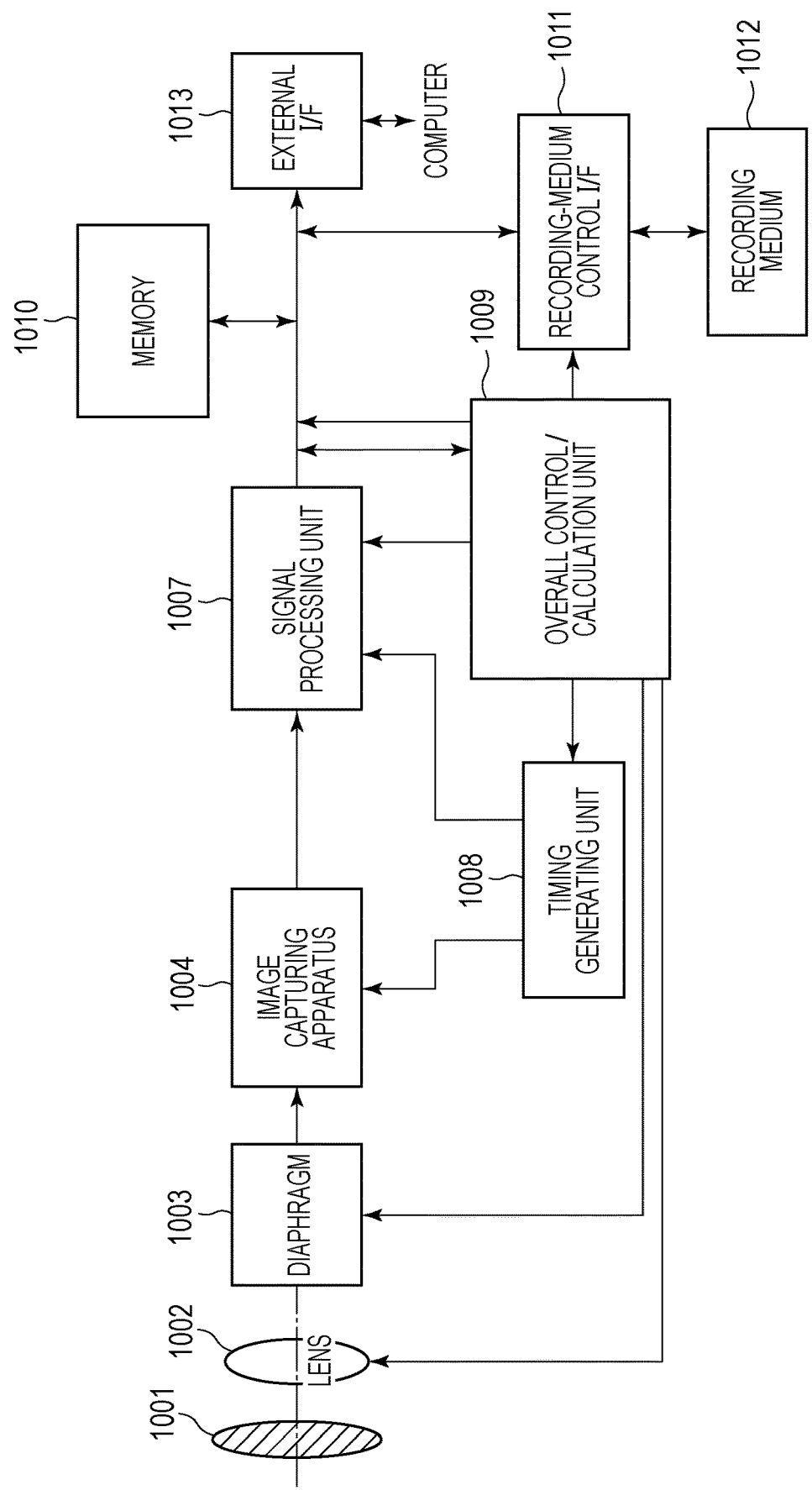
FIG. 15 is a functional block diagram of a photoelectrical conversion system according to a fifth embodiment.

A photoelectrical conversion system according to this embodiment will be described with reference to FIG. 15. FIG. 15 is a block diagram illustrating, in outline, the configuration of the photoelectrical conversion system according to this embodiment.

The photoelectric conversion apparatuses described in the first to third embodiments are applicable to various photoelectrical conversion systems. Examples of the applicable photoelectrical conversion systems include a digital still camera, a digital camcorder, a monitoring camera, a copying machine, a facsimile machine, a mobile phone, an on-vehicle camera, and an observatory satellite. A camera module including an optical system, such as a lens, and an image capturing apparatus is also included in the photoelectrical conversion systems. FIG. 15 illustrates a block diagram of a digital still camera as an example.

The photoelectrical conversion system illustrated in FIG. 15 includes an image capturing apparatus 1004, which is an example of the photoelectric conversion apparatuses, and a lens 1002 that forms an optical image of an object on the image capturing apparatus 1004. The photoelectrical conversion system further includes a diaphragm 1003 for varying the amount of light passing through the lens 1002 and a barrier 1001 for protecting the lens 1002. The lens 1002 and the diaphragm 1003 constitute an optical system for collecting light onto the image capturing apparatus 1004. The image capturing apparatus 1004 is any one of the photoelectric conversion apparatuses of the above embodiments and converts an optical image formed by the lens 1002 to an electrical signal.

The photoelectrical conversion system further includes a signal processing unit or circuit 1007, which is an image generating unit or circuit that generates an image by processing a signal output from the image capturing apparatus 1004. The signal processing unit 1007 performs an operation of performing various kinds of correction and compression as necessary and outputting image data. The signal processing unit 1007 may be provided on a semiconductor substrate on which the image capturing apparatus 1004 is disposed or a semiconductor substrate different from the substrate of the image capturing apparatus 1004.

The photoelectrical conversion system further includes a memory 1010 for temporality storing image data and an external interface (an external I/F) 1013 for communicating with an external computer or the like. The photoelectrical conversion system further includes a recording medium 1012, such as a semiconductor memory, for recording or reading image data and a recording-medium control interface (a recording-medium control I/F) 1011 for recording to or reading from the recording medium 1012. The recording medium 1012 may be housed in the photoelectrical conversion system or may be detachable.

The photoelectrical conversion system further includes an overall control/calculation unit or circuit 1009 that performs various calculations and controls the entire digital still camera and a timing generating unit or circuit 1008 that outputs various timing signals to the image capturing apparatus 1004 and the signal processing unit 1007. The timing signals may be input from the outside, and the photoelectrical conversion system should include at least the image capturing apparatus 1004 and the signal processing unit 1007 that processes the signal output from the image capturing apparatus 1004.

The image capturing apparatus 1004 outputs an imaging signal to the signal processing unit 1007. The signal processing unit 1007 performs predetermined signal processing on the imaging signal output from the image capturing apparatus 1004 and outputs image data. The signal processing unit 1007 generates an image using the imaging signal.

Thus, this embodiment provides a photoelectrical conversion system incorporating the photoelectric conversion apparatus (the image capturing apparatus) according to any of the embodiments.

Sixth Embodiment

Figure 16A:
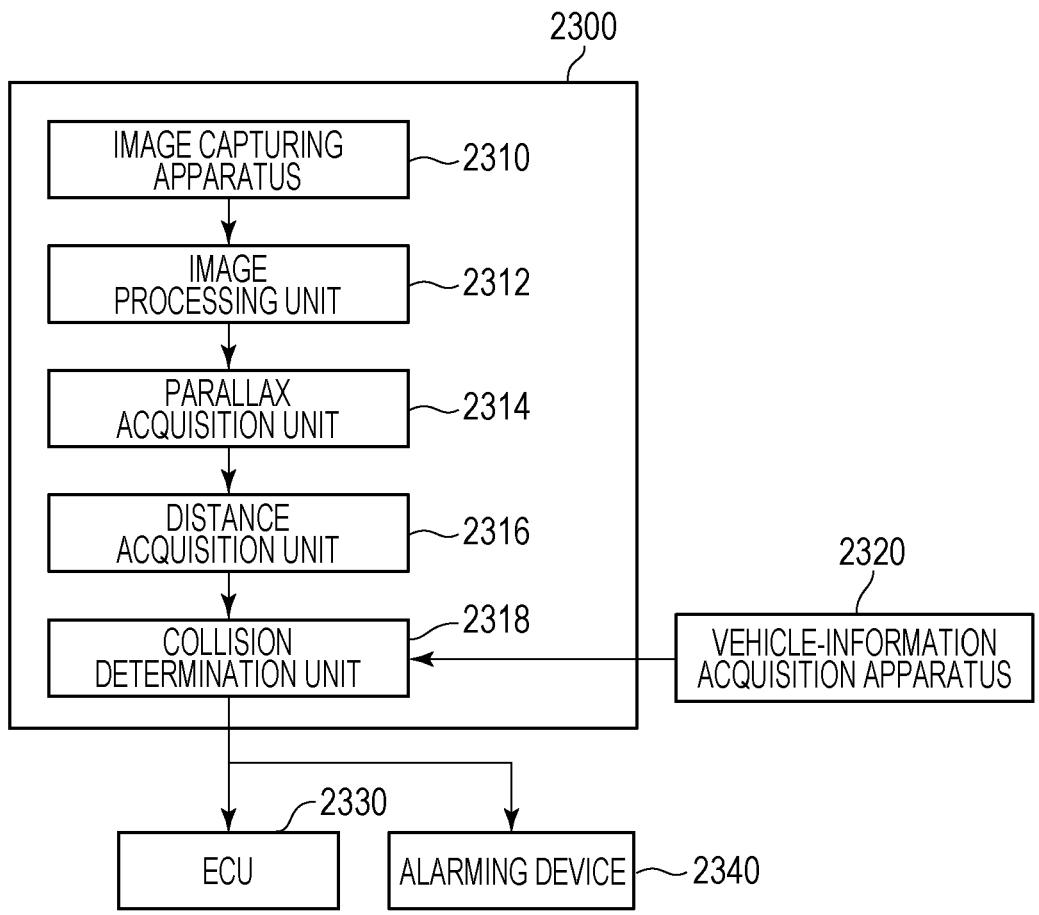
FIGS. 16A and 16B are functional block diagrams of a photoelectrical conversion system according to a sixth embodiment.
Figure 16B:
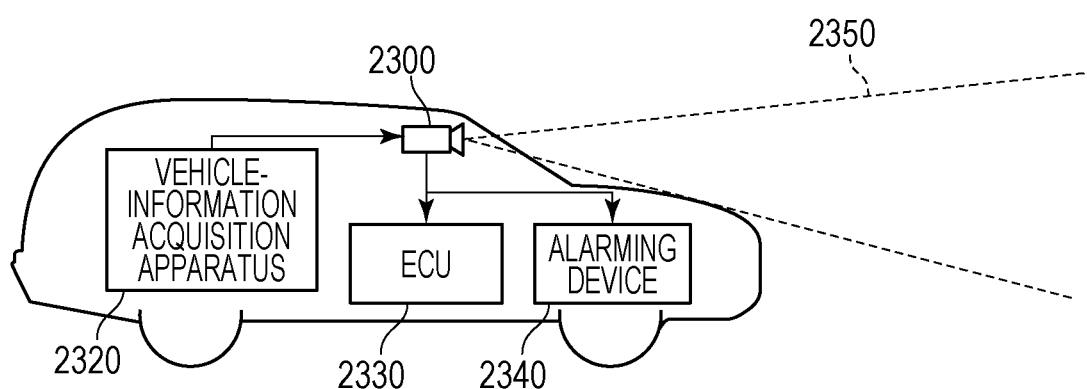

A photoelectrical conversion system and a moving body of this embodiment will be described with reference to FIGS. 16A and 16B. FIGS. 16A and 16B are diagrams illustrating the configurations of the photoelectrical conversion system and the moving body of this embodiment.

FIG. 16A illustrates an example of a photoelectrical conversion system related to an on-vehicle camera. The photoelectrical conversion system 2300 includes an image capturing apparatus 2310. The image capturing apparatus 2310 is the photoelectric conversion apparatus according to any one of the above embodiments. The photoelectrical conversion system 2300 includes an image processing unit or circuit 2312 that performs image processing on a plurality of image data obtained by the image capturing apparatus 2310 and a parallax acquisition unit or circuit 2314 that calculates the parallax (the phase difference between parallax images) from the plurality of image data obtained by the photoelectrical conversion system 2300. The photoelectrical conversion system 2300 further includes a distance acquisition unit or circuit 2316 that calculates the distance to the object on the basis of the calculated parallax and a collision determination unit or circuit 2318 that determines whether collision can occur on the basis of the calculated distance. The parallax acquisition unit 2314 and the distance acquisition unit 2316 are examples of a distance-information acquisition unit or circuit that acquires information on the distance to the object. In other words, the distance information is information on the parallax, the amount of defocus, the distance to the object, and so on. The collision determination unit 2318 may determine whether collision can occur using any of the distance information. The distance-information acquisition unit may be implemented by specifically designed hardware or a software module.

The distance-information acquisition unit may be implemented by a field-programmable gate array (FPGA), an application specific integrated circuit (ASIC), or a combination thereof.

The photoelectrical conversion system 2300 is connected to a vehicle-information acquisition apparatus 2320 and can acquire vehicle information, such as a vehicle speed, a yaw rate, and a rudder angle. The photoelectrical conversion system 2300 is also connected to an electronic control unit (ECU) or circuit 2330, which is a control unit that outputs a control signal for causing the vehicle to generate a braking force on the basis of the determination result of the collision determination unit 2318. The photoelectrical conversion system 2300 is also connected to an alarming device 2340 that gives an alarm to the driver on the basis of the determination result of the collision determination unit 2318. For example, if the determination result of the collision determination unit 2318 shows a high possibility of collision, then the ECU 2330 controls the vehicle to avoid collision by braking, returning the accelerator, or reducing engine output, thereby reducing damage. The alarming device 2340 alarms the user by giving an alarm sound, displaying alarm information on the screen of a car navigation system or the like, or vibrating the seat belt or the steering.

This embodiment captures an image of the surrounding of the vehicle, for example, ahead or the back, with the photoelectrical conversion system 2300. FIG. 16B shows the photoelectrical conversion system when capturing an image ahead of the vehicle (an image capturing range 2350). The vehicle-information acquisition apparatus 2320 issues an instruction to the photoelectrical conversion system 2300 or the image capturing apparatus 2310. This configuration allows the accuracy of ranging to be increased.

The above example shows control to avoid collision with another vehicle. The photoelectrical conversion system 2300 is also applicable to automated cruise control for following another vehicle and automated cruise control for preventing the vehicle from straying out of the lane. The photoelectrical conversion system 2300 is also applicable not only to vehicles, such as automobiles, but also to moving bodies (moving apparatuses), such as ships, aircraft, and industrial robots. In addition, the photoelectrical conversion system 2300 is applicable not only to moving bodies but also to various equipment using object recognition, such as an intelligent transportation system (ITS).

Seventh Embodiment

Figure 17:
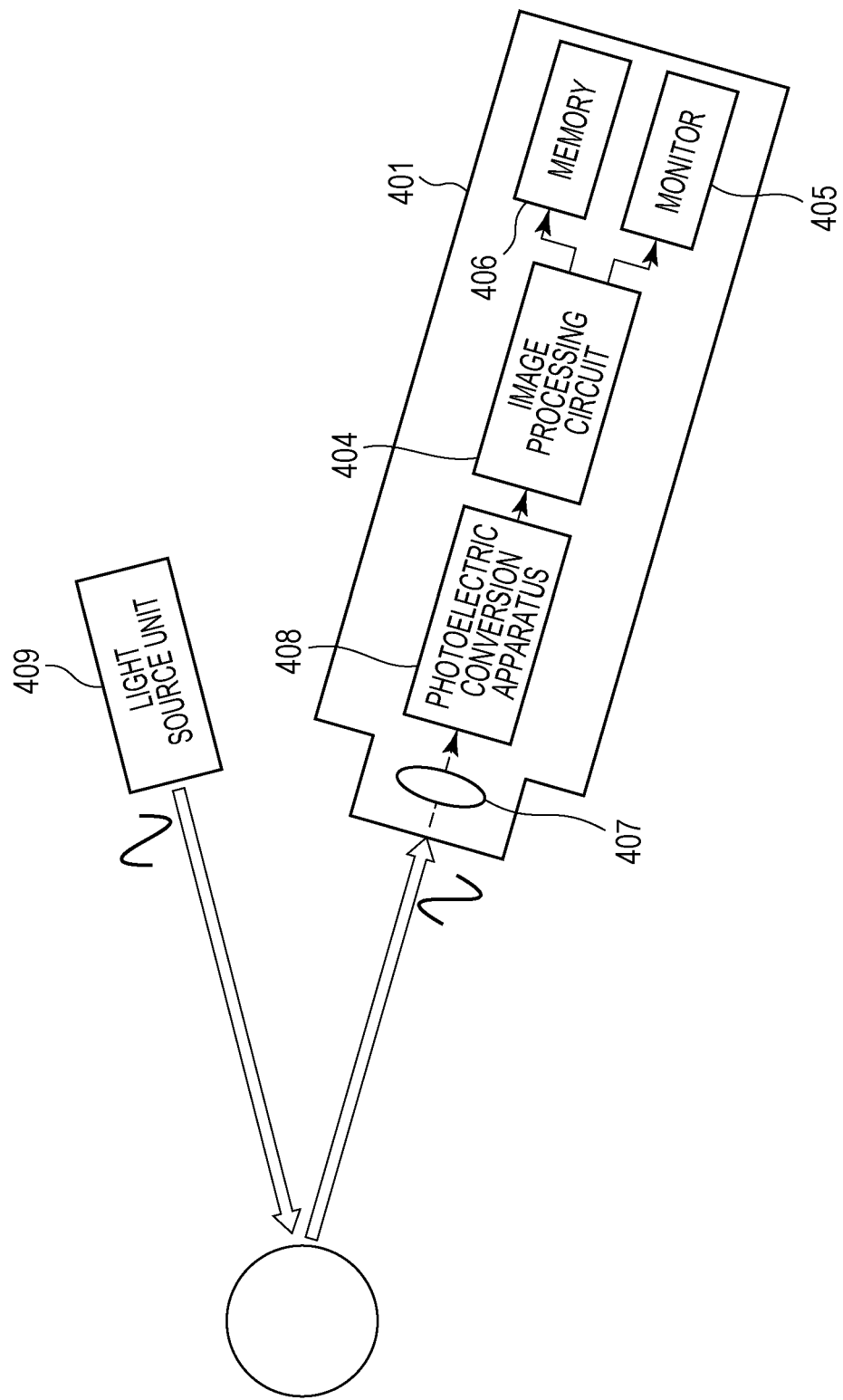
FIG. 17 is a functional block diagram of a photoelectrical conversion system according to a seventh embodiment.

A photoelectrical conversion system of this embodiment will be described with reference to FIG. 17. FIG. 17 is a block diagram illustrating an example configuration of a range image sensor, which is the photoelectrical conversion system of this embodiment.

As shown in FIG. 17, the range image sensor 401 includes an optical system 407, a photoelectric conversion apparatus 408, an image processing circuit 404, a monitor 405, and a memory 406. The range image sensor 401 receives light projected from a light source unit or circuit 409 toward an object and reflected by the surface of the object (modulated light or pulsed light) to acquire a range image according to the distance to the object.

The optical system 407 includes one or a plurality of lenses and guides the image light (incident light) from the object to the photoelectric conversion apparatus 408 to form an image on the light receiving surface (sensor) of the photoelectric conversion apparatus 408.

The photoelectric conversion apparatus 408 is any one of the photoelectric conversion apparatuses of the above embodiments, in which a range signal indicating a range obtained from the received-light signal output from the photoelectric conversion apparatus 408 is supplied to the image processing circuit 404.

The image processing circuit 404 performs image processing for forming a range image on the basis of the range signal supplied from the photoelectric conversion apparatus 408. The range image (image data) obtained by the image processing is supplied to the monitor 405 for display or supplied to the memory 406 for storage (recording).

The range image sensor 401 with this configuration can acquire, for example, an accurate range image with improvement in pixel characteristics by incorporating the photoelectric conversion apparatus described above.

Eighth Embodiment

Figure 18:
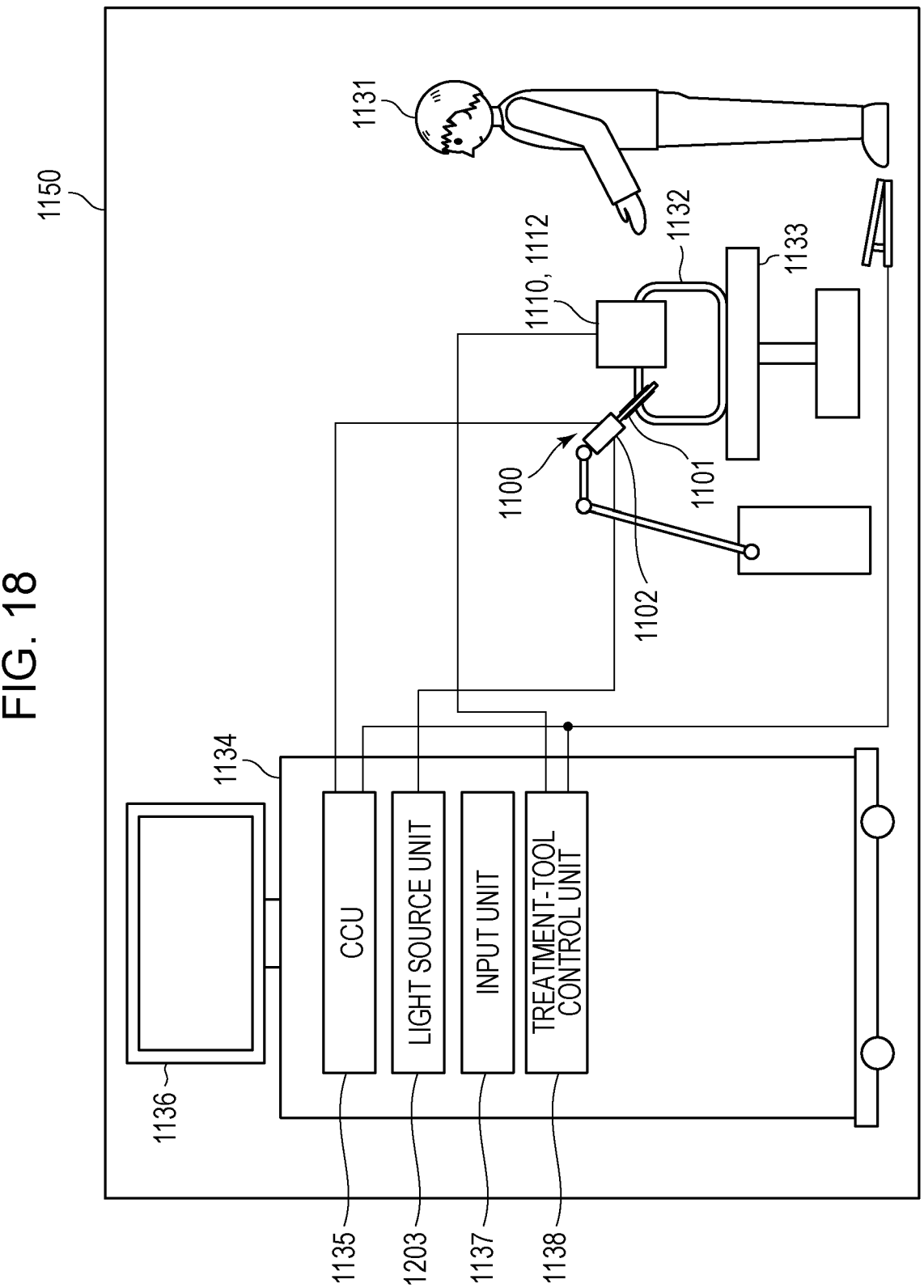
FIG. 18 is a functional block diagram of a photoelectrical conversion system according to an eighth embodiment.

A photoelectrical conversion system of this embodiment will be described with reference to FIG. 18. FIG. 18 is a diagram illustrating an example schematic configuration of an endoscopic surgery system, which is the photoelectrical conversion system of this embodiment.

FIG. 18 illustrates a state in which an operator (doctor) 1131 performs surgery on a patient 1132 on a patient bed 1133 using an endoscopic surgery system 1150. As shown, the endoscopic surgery system 1150 includes an endoscope 1100, a surgical instrument 1110, and a cart 1134 in which various apparatuses for endoscopic surgery are mounted.

The endoscope 1100 includes a lens tube 1101 to be inserted into the body cavity of the patient 1132 by a predetermined length from the leading end and a camera head 1102 connected to the base end of the lens tube 1101. In the illustrated example, the endoscope 1100 is a so-called rigid scope including the rigid lens tube 1101. Alternatively, the endoscope 1100 may be a so-called flexible scope including a flexible lens tube.

The lens tube 1101 includes an opening in which an object lens is fitted at the leading end. The endoscope 1100 connects to a light source unit or circuit 1203. The light generated by the light source unit 1203 is guided to the leading end of the lens tube 1101 by a light guide extending in the lens tube 1101 and is applied to the observation target in the body cavity of the patient 1132 via the object lens. The endoscope 1100 may be a forward-viewing endoscope, a forward-oblique viewing endoscope, or a side-viewing endoscope.

The camera head 1102 houses an optical system and a photoelectric conversion apparatus. The reflected light (observation light) from the observation target is collected to the photoelectric conversion apparatus by the optical system. The observation light is photoelectrically converted by the photoelectric conversion apparatus to form an electrical signal corresponding to the observation light, that is, an image signal corresponding to the observed image. The photoelectric conversion apparatus may be the photoelectric conversion apparatus according to any one of the embodiments. The image signal is transmitted to a camera control unit (CCU) or circuit 1135 as raw data.

The CCU 1135 is constituted by a central processing unit (CPU) or a graphics processing unit (GPU), which provides control over the operation of the endoscope 1100 and a display unit or circuit 1136. The CCU 1135 receives the image signal from the camera head 1102 and performs various image processing operations for displaying an image based on the image signal, such as development processing (demosaicing), on the image signal.

The display unit 1136 displays an image based on the image signal subjected to image processing by the CCU 1135 under the control of the CCU 1135.

The light source unit 1203 includes a light source, such as a light emitting diode (LED), and supplies irradiation light in capturing an image of the operative site or the like to the endoscope 1100.

An input unit or circuit 1137 is an input interface for the endoscopic surgery system 1150. The user can input various kinds of information and instructions to the endoscopic surgery system 1150 via the input unit 1137.

A treatment-tool control unit or circuit 1138 controls driving of an energy treatment tool 1112 for cauterization or incision of tissue or sealing of blood vessels.

The light source unit 1203 that supplies irradiation light for capturing an image of the operative site to the endoscope 1100 may include a white light source formed of an LED, a laser light source, or a combination thereof. If the white light source is a combination of red, green, and blue (RGB) laser sources, the output intensities and output timings of the individual colors (wavelengths) can be controlled with high accuracy. This enables the light source unit 1203 to adjust the white balance of the captured image. In this case, images corresponding to RGB can be captured in time-division by applying RGB laser beams from the individual RGB laser sources to the observation target and controlling the driving of the image sensor of the camera head 1102 in synchronism with the irradiation timings. This method allows acquiring a color image even if the image sensor has no color filter.

The driving of the light source unit 1203 may be controlled so as to change the intensity of output light at predetermined intervals. Controlling the driving of the image sensor of the camera head 1102 in synchronism with the timing of a change in light intensity to acquire images in time-division and combining the images allows an image in a highly dynamic range without black underexposure images and blown out highlights to be generated.

The light source unit 1203 may be capable of supplying light in a predetermined wavelength band corresponding to special light observation. The special light observation uses, for example, the wavelength dependence of light absorption in body tissue. Specifically, the special light observation applies light in a wavelength band narrower than that of irradiation light at normal observation (that is, white light) to capture an image of predetermined tissue, such as the blood vessels of the superficial portion of a mucous membrane, with high contrast.

The special light observation may include fluorescence observation for capturing an image with fluorescence generated by applying exciting light. The fluorescence observation applies exciting light to body tissue to observe fluorescence from the body tissue or locally injects a reagent, such as indocyanine green (ICG), to body tissue and applies exciting light corresponding to the fluorescence wavelength of the reagent to the body tissue to capture a fluorescent image. The light source unit 1203 may be capable of supplying narrow-band light and/or exciting light corresponding to such special light observation.

Ninth Embodiment

Figure 19A:
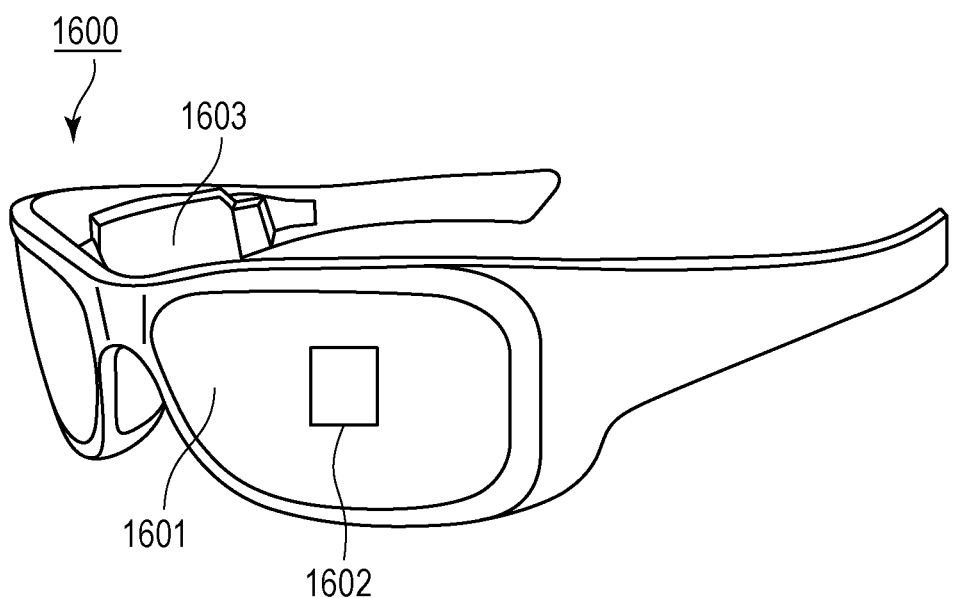
FIGS. 19A and 19B are functional block diagrams of a photoelectrical conversion system according to a ninth embodiment.

A photoelectrical conversion system of this embodiment will be described with reference to FIGS. 19A and 19B. FIG. 19A illustrates eyeglasses 1600 (smartglasses), which is the photoelectrical conversion system of this embodiment. The eyeglasses 1600 include a photoelectric conversion apparatus 1602. The photoelectric conversion apparatus 1602 is one of the photoelectric conversion apparatuses described in the above embodiments. A display unit, device, or circuit including a light-emitting unit, device, or circuit, such as an organic light-emitting diode (OLED) or an LED, may be disposed on the back of lenses 1601. The number of the photoelectric conversion apparatus 1602 may be one or two or more. Alternatively, a plurality of kinds of photoelectric conversion apparatuses may be combined. The placement position of the photoelectric conversion apparatus 1602 is not limited to that in FIG. 19A.

The eyeglasses 1600 further include a control unit or circuit 1603. The control unit 1603 functions as a power source that supplies electric power to the photoelectric conversion apparatus 1602 and the display unit. The control unit 1603 controls the operation of the photoelectric conversion apparatus 1602 and the display unit. The lenses 1601 include an optical system for collecting light to the photoelectric conversion apparatus 1602.

Figure 19B:
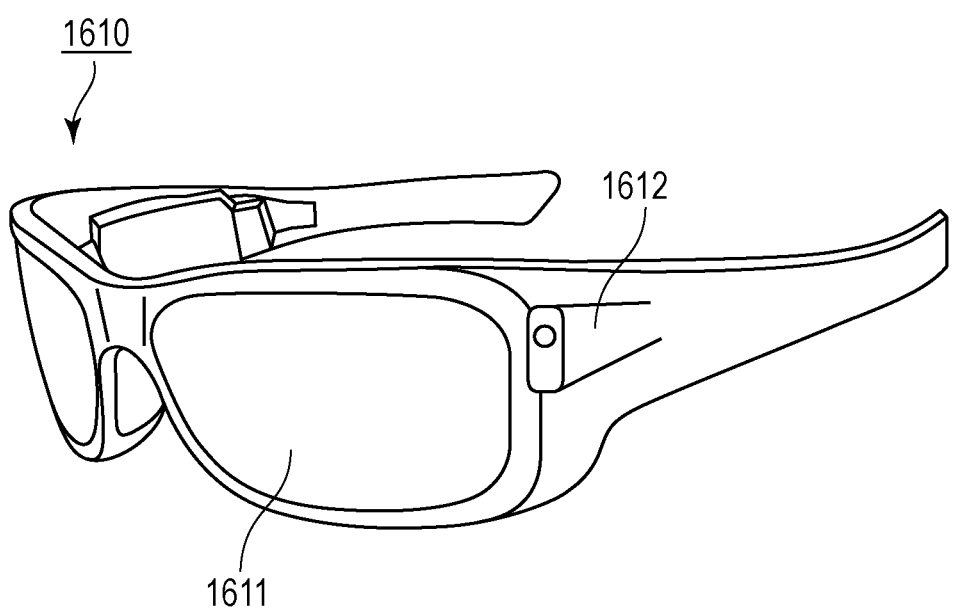

FIG. 19B illustrates eyeglasses 1610 (smartglasses) according to an application. The eyeglasses 1610 includes a control unit 1612. The control unit 1612 includes a photoelectric conversion apparatus corresponding to the photoelectric conversion apparatus 1602 and a display unit, device, or circuit. Lenses 1611 include the photoelectric conversion apparatus in the control unit 1612 and an optical system for projecting light from the display unit. The lenses 1611 receive a projected image. The control unit 1612 functions as a power source that supplies electric power to the photoelectric conversion apparatus and the display unit and controls the operation of the photoelectric conversion apparatus and the display unit. The control unit may include a line-of-sight detecting unit that detects the line of sight of the wearer. The line-of-sight detection may use infrared light. An infrared-emitting unit, device, or circuit emits infrared light to the eyeballs of the user who is looking at the displayed image. The reflected light of the generated infrared light reflected from the eyeballs is detected by an imaging unit or circuit including a light-receiving element to give a captured image of the eyeballs. Providing a reducing unit or circuit that reduces the light from the infrared-emitting unit to the display unit in plan view reduces a decrease in image quality.

The line of sight of the user to the displayed image is detected from the captured image of the eyeballs obtained by infrared imaging. The line-of-sight detection using the captured image of the eyeballs may use any known method. One example is a method of line-of-sight detection based on a Purkinje image using reflection of irradiation light from the cornea.

More specifically, a line-of-sight detection process based on a pupil center corneal reflection method is performed. The line of sight of the user is detected by calculating the eye vector indicating the orientation (rotational angle) of the eyeballs on the basis of the image of the pupils included in a captured image of the eyeballs and the Purkinje image using the pupil center corneal reflection method.

The display unit of this embodiment may include a photoelectric conversion apparatus including a light-receiving element and may control a displayed image on the display unit on the basis of line-of-sight information on the user from the photoelectric conversion apparatus.

Specifically, the display unit is segmented into a first view area at which the user looks and a second view area other than the first view area on the basis of line-of-sight information. The first view area and the second view area may be determined by a control unit or circuit 1612 for the display unit or may be received after being determined by an external control unit. In the display area of the display unit, the display resolution of the first view area may be controlled so as to be higher than the display resolution of the second view area. In other words, the resolution of the second view area may be lower than the resolution of the first view area.

The display area may include a first display area and a second display area different from the first display area. A higher priority area may be determined from the first display area and the second display area on the basis of line-of-sight information. The first view area and the second view area may be determined by the control unit 1612 of the display unit or may be received after being determined by an external control unit or circuit. The resolution of a higher priority area may be controlled so as to be higher than the resolution of an area other than the higher priority area. In other words, the resolution of a relatively low priority area may be set lower.

The determination of the first view area and the higher priority area may be made using artificial intelligence (AI). The AI may be a model configured to estimate the angle of the line of sight and the distance to the object of the line of sight from the images of eyeballs using the images of the eyeballs and the direction in which the eyeballs of the images actually view as training data. An AI program may be provided at the display unit, the photoelectric conversion apparatus, or an external apparatus. The AI program, if provided at the external apparatus, is transmitted to the display unit via communication.

Display control based on visual detection is applicable to smartglasses further including a photoelectric conversion apparatus that images the outside. The smartglasses can display the captured external information in real time.

Modifications

The disclosure is not limited to the above embodiments and can be variously modified.

For example, an example in which part of the configuration of an embodiment is added to another embodiment or replaced with part of the configuration of another embodiment is also included in embodiments of the disclosure.

The photoelectrical conversion systems shown in the fourth embodiment and the fifth embodiment are examples of a photoelectrical conversion system to which the photoelectric conversion apparatus is applicable. The configurations of the photoelectrical conversion systems to which the photoelectric conversion apparatus according to an embodiment of the disclosure is applicable are not limited to the configurations shown in FIG. 15 and FIGS. 16A and 16B. Same applies to the ToF system shown in the sixth and seventh embodiments, the endoscope shown in the eighth embodiment, and the smartglasses shown in the ninth embodiment.

The photoelectric conversion apparatuses of the above embodiments are also applicable to sensors in automobiles. One applicable example is a sensor for use in detecting driver's face, facial expression, or line of sight. Driver's inattention, falling asleep, fainting, and so on can be detected using the output from the sensor. Identification of the driver can also be performed.

The present disclosure includes the following configurations:

Configuration 1

A photoelectric conversion apparatus including a pixel area including a plurality of pixels each including an avalanche photodiode including an anode and a cathode, wherein the plurality of pixels includes effective pixels that output a photon detection signal responsive to photo detection, dummy pixels that do not output the photon detection signal, and optical black pixels including a light shielding portion, wherein the pixel area includes a first area including the effective pixels, a second area including the dummy pixels, and a third area including the optical black pixels, wherein the second area includes a first portion in contact with an end of the pixel area and a second portion, wherein the first portion, the first area, the second portion, and the third area are disposed in this order in a first direction, and wherein, a width of the second portion is larger than a width of the first portion in the first direction.

Configuration 2

The photoelectric conversion apparatus according to Configuration 1, wherein the second area includes a third portion in contact with an end of the pixel area, wherein the first area and the third portion are arranged in a second direction crossing the first direction, and wherein the width of the second portion in the first direction is larger than a width of the third portion in the second direction.

Configuration 3

The photoelectric conversion apparatus according to Configuration 1 or 2, wherein dummy pixels arranged in the second portion along the width in the first direction are larger in number than dummy pixels arranged in the first portion along the width in the first direction.

Configuration 4

The photoelectric conversion apparatus according to any one of Configurations 1 to 3, wherein the effective pixels are connected to a counter circuit that counts the photon detection signal, and wherein the dummy pixel is not connected to the counter circuit.

Configuration 5

The photoelectric conversion apparatus according to Configuration 4, wherein the second area includes a test pixel connected, at a node different from the anode and the cathode, to an input node of the counter circuit.

Configuration 6

The photoelectric conversion apparatus according to any one of Configurations 1 to 5, wherein the plurality of pixels each include a pixel separating portion between adjacent pixels.

Configuration 7

The photoelectric conversion apparatus according to Configuration 6, wherein the pixel separating portion separates the first area in which the effective pixels are disposed and the second area in which the dummy pixels are disposed from each other.

Configuration 8

The photoelectric conversion apparatus according to Configuration 6 or 7, wherein the pixel separating portion separates the third area in which the optical black pixels are disposed and the second area in which the dummy pixels are disposed from each other.

Configuration 9

The photoelectric conversion apparatus according to any one of Configurations 1 to 8, further including a fourth area including the optical black pixels (For example, the third area 10c in FIG. 12), wherein the second area includes a fourth portion, for example, between range B-C in FIG. 4), wherein the fourth area and the fourth portion are arranged in a third direction crossing the first direction, and wherein a width of the fourth portion in the third direction is larger than the width of the first portion in the first direction.

Configuration 10

The photoelectric conversion apparatus according to Configuration 9, wherein dummy pixels arranged in the fourth portion along the width in the third direction are larger in number than dummy pixels arranged in the first portion along the width in the first direction.

Configuration 11

The photoelectric conversion apparatus according to Configuration 2, wherein the width of the second portion in the first direction is larger than ten times a width of the third portion in the second direction.

Configuration 12

The photoelectric conversion apparatus according to any one of Configurations 1 to 11, wherein dummy pixels arranged in the second portion along the width in the first direction are larger than ten times in number dummy pixels arranged in the first portion along the width in the first direction.

Configuration 13

The photoelectric conversion apparatus according to any one of Configurations 1 to 12, further including a switch connected to one node of the anode and the cathode and to a power source to which a driving voltage is applied, wherein the switch changes a resistant value between the one node and the power source.

Configuration 14

The photoelectric conversion apparatus according to Configuration 13, wherein the dummy pixels each include a plurality of avalanche photodiodes for each switch.

Configuration 15

The photoelectric conversion apparatus according to any one of Configurations 1 to 14, wherein, of the dummy pixels, a first dummy pixel includes more avalanche photodiodes than a second dummy pixel.

Configuration 16

The photoelectric conversion apparatus according to Configuration 15, wherein a distance from a boundary between the first area and the second area to the first dummy pixel is longer than a distance from the boundary to the second dummy pixel.

Configuration 17

The photoelectric conversion apparatus according to any one of Configurations 13 to 16, wherein the switch comprises a transistor.

Configuration 18

The photoelectric conversion apparatus according to any one of Configurations 1 to 17, wherein the avalanche photodiodes of the effective pixels are recharged in a first cycle.

Configuration 19

The photoelectric conversion apparatus according to Configuration 18, wherein the avalanche photodiodes of the dummy pixels are recharged in a second cycle different from the first cycle.

Configuration 20

The photoelectric conversion apparatus according to Configuration 19, wherein the second cycle is longer than the first cycle.

Configuration 21

A system including the photoelectric conversion apparatus according to any one of Configurations 1 to 20 and a signal processing unit or circuit that processes a signal output from the photoelectric conversion apparatus.

Configuration 22

A moving body including the photoelectric conversion apparatus according to any one of Configurations 1 to 20, an information acquisition unit or circuit that acquires information on a distance to an object from a parallax image based on a signal from the photoelectric conversion apparatus, and a control unit or circuit that controls the moving body based on the information on the distance.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-171691, filed Oct. 20, 2021 and No. 2022-115906, filed Jul. 20, 2022, which are hereby incorporated by reference herein in their entirety.

What is claimed is:

1. A photoelectric conversion apparatus comprising:
a pixel area including a plurality of pixels each including an avalanche photodiode including an anode and a cathode,
wherein the plurality of pixels includes:
effective pixels that output a photon detection signal responsive to photo detection;
dummy pixels that do not output the photon detection signal; and
optical black pixels including a light shielding portion,
wherein the pixel area includes a first area including the effective pixels, a second area including the dummy pixels, and a third area including the optical black pixels,
wherein the second area includes a first portion in contact with an end of the pixel area and a second portion,
wherein the first portion, the first area, the second portion, and the third area are disposed in this order in a first direction, and
wherein, a width of the second portion is larger than a width of the first portion in the first direction,
wherein the avalanche photodiodes of the effective pixels are recharged in a first cycle, and
wherein the avalanche photodiodes of the dummy pixels are recharged in a second cycle different from the first cycle.

2. The photoelectric conversion apparatus according to claim 1,
wherein the second area includes a third portion in contact with an end of the pixel area,
wherein the first area and the third portion are arranged in a second direction crossing the first direction, and
wherein the width of the second portion in the first direction is larger than a width of the third portion in the second direction.

3. The photoelectric conversion apparatus according to claim 2, wherein the width of the second portion in the first direction is larger than ten times the width of the third portion in the second direction.

4. The photoelectric conversion apparatus according to claim 1, wherein dummy pixels arranged in the second portion along the width in the first direction are larger in number than dummy pixels arranged in the first portion along the width in the first direction.

5. The photoelectric conversion apparatus according to claim 1,
wherein the effective pixels are connected to a counter circuit that counts the photon detection signal, and
wherein the dummy pixels areis not connected to the counter circuit.

6. The photoelectric conversion apparatus according to claim 5, wherein the second area includes a test pixel connected, at a node different from the anode and the cathode, to an input node of the counter circuit.

7. The photoelectric conversion apparatus according to claim 1, wherein the plurality of pixels each include a pixel separating portion between adjacent pixels.

8. The photoelectric conversion apparatus according to claim 7, wherein the pixel separating portion separates the first area in which the effective pixels are disposed and the second area in which the dummy pixels are disposed from each other.

9. The photoelectric conversion apparatus according to claim 7, wherein the pixel separating portion separates the third area in which the optical black pixels are disposed and the second area in which the dummy pixels are disposed from each other.

10. The photoelectric conversion apparatus according to claim 1, further comprising:
a fourth area including the optical black pixels,
wherein the second area includes a fourth portion,
wherein the fourth area and the fourth portion are arranged in a third direction crossing the first direction, and
wherein a width of the fourth portion in the third direction is larger than the width of the first portion in the first direction.

11. The photoelectric conversion apparatus according to claim 10, wherein dummy pixels arranged in the fourth portion along the width in the third direction are larger in number than dummy pixels arranged in the first portion along the width in the first direction.

12. The photoelectric conversion apparatus according to claim 1, wherein dummy pixels arranged in the second portion along the width in the first direction are larger than ten times in number dummy pixels arranged in the first portion along the width in the first direction.

13. The photoelectric conversion apparatus according to claim 1, further comprising:
a switch connected to one node of the anode and the cathode and to a power source to which a driving voltage is applied,
wherein the switch changes a resistant value between the one node and the power source.

14. The photoelectric conversion apparatus according to claim 13, wherein the dummy pixels each include a plurality of avalanche photodiodes for the switch.

15. The photoelectric conversion apparatus according to claim 14, wherein, of the dummy pixels, a first dummy pixel includes more avalanche photodiodes than a second dummy pixel.

16. The photoelectric conversion apparatus according to claim 15, wherein a distance from a boundary between the first area and the second area to the first dummy pixel is longer than a distance from the boundary to the second dummy pixel.

17. The photoelectric conversion apparatus according to claim 13, wherein the switch comprises a transistor.

18. The photoelectric conversion apparatus according to claim 1, wherein the second cycle is longer than the first cycle.

19. A system comprising:
the photoelectric conversion apparatus according to claim 1; and
a signal processing circuit that processes a signal output from the photoelectric conversion apparatus.

20. A moving body comprising:
the photoelectric conversion apparatus according to claim 1;
an information acquisition circuit that acquires information on a distance to an object from a parallax image based on a signal from the photoelectric conversion apparatus; and
a control circuit that controls the moving body based on the information on the distance.

* * * * *